United States Patent
Otsuka

(10) Patent No.: US 12,005,350 B2
(45) Date of Patent: Jun. 11, 2024

(54) IMAGE TRANSMISSION/RECEPTION SYSTEM, IMAGE TRANSMISSION APPARATUS, IMAGE RECEPTION APPARATUS, IMAGE TRANSMISSION/RECEPTION METHOD, AND PROGRAM

(71) Applicant: Sony Interactive Entertainment Inc., Tokyo (JP)

(72) Inventor: Katsushi Otsuka, Aichi (JP)

(73) Assignee: Sony Interactive Entertainment Inc., Tokyo (JP)

( * ) Notice: Subject to any disclaimer, the term of this patent is extended or adjusted under 35 U.S.C. 154(b) by 291 days.

(21) Appl. No.: 17/435,857

(22) PCT Filed: Dec. 25, 2019

(86) PCT No.: PCT/JP2019/050906
§ 371 (c)(1),
(2) Date: Sep. 2, 2021

(87) PCT Pub. No.: WO2020/194957
PCT Pub. Date: Oct. 1, 2020

(65) Prior Publication Data
US 2022/0152489 A1    May 19, 2022

(30) Foreign Application Priority Data
Mar. 25, 2019    (JP) .................. 2019-056322

(51) Int. Cl.
*A63F 13/355* (2014.01)
*A63F 13/52* (2014.01)
(Continued)

(52) U.S. Cl.
CPC ............ *A63F 13/355* (2014.09); *A63F 13/52* (2014.09); *G06T 3/40* (2013.01); *G06T 7/246* (2017.01); *A63F 2300/538* (2013.01)

(58) Field of Classification Search
CPC ................. A63F 13/355; A63F 13/52
See application file for complete search history.

(56) References Cited

U.S. PATENT DOCUMENTS

| 6,130,911 A | 10/2000 | Lei |
| 6,493,466 B1 | 12/2002 | Honda |

(Continued)

FOREIGN PATENT DOCUMENTS

| CN | 106664376 A | 5/2017 |
| CN | 109076258 A | 12/2018 |

(Continued)

OTHER PUBLICATIONS

International Search Report for corresponding PCT Application No. PCT/JP2019/050906, 6 pages, dated Mar. 17, 2020.

(Continued)

*Primary Examiner* — James S. McClellan
(74) *Attorney, Agent, or Firm* — Matthew B. Dernier, Esq.

(57) ABSTRACT

An upscaling unit generates a first to-be-displayed image on the basis of first image data. An alternative image generation unit generates an alternative image by estimating, on the basis of the first image data, a second to-be-displayed image to be generated on the basis of second image data. A display control unit displays, after displaying the image generated on the basis of the first image data, any one of the image generated on the basis of the second image data and the alternative image, depending on whether or not reception of the second image data has succeeded. A transmission control unit controls whether or not to transmit, to a terminal, the (Continued)

second image data on the basis of a possibility of successful estimation of the second to-be-displayed image on the basis of the first image data by the alternative image generation unit.

17 Claims, 13 Drawing Sheets

(51) Int. Cl.
  *G06T 3/40* (2006.01)
  *G06T 7/246* (2017.01)

(56) References Cited

U.S. PATENT DOCUMENTS

| | | | |
|---|---|---|---|
| 8,243,806 | B2 | 8/2012 | Hamada |
| 10,679,413 | B2 | 6/2020 | Knight |
| 10,931,913 | B2 | 2/2021 | Tanikawa |
| 11,363,382 | B2* | 6/2022 | Carrigan ............... G10L 19/167 |
| 2002/0080881 | A1 | 6/2002 | Honda |
| 2002/0118748 | A1 | 8/2002 | Inomata |
| 2007/0248331 | A1 | 10/2007 | Hamada |
| 2009/0213936 | A1 | 8/2009 | Hamano |
| 2011/0126255 | A1* | 5/2011 | Perlman ............. H04N 21/6587 725/116 |
| 2016/0254972 | A1* | 9/2016 | Oshiba ................ H04L 43/0882 370/252 |
| 2017/0098332 | A1 | 4/2017 | Knight |
| 2017/0301061 | A1* | 10/2017 | Niikura ................ H04N 19/587 |
| 2019/0356880 | A1 | 11/2019 | Tanikawa |
| 2020/0126280 | A1* | 4/2020 | Amimoto ................ G06F 3/012 |

FOREIGN PATENT DOCUMENTS

| | | |
|---|---|---|
| JP | 6197331 A | 7/1994 |
| JP | 2588925 B2 | 3/1997 |
| JP | 11298890 A | 10/1999 |
| JP | 2000308059 A | 11/2000 |
| JP | 2002016923 A | 1/2002 |
| JP | 2007295142 A | 11/2007 |
| JP | 2009302755 A | 12/2009 |
| JP | 4930409 B2 | 5/2012 |
| JP | 2014220571 A | 11/2014 |
| JP | 2017011397 A | 1/2017 |
| JP | 2017034402 A | 2/2017 |

OTHER PUBLICATIONS

Notification of Reasons for Refusal for corresponding JP Application No. 2021-508767, 13 pages, dated Jun. 1, 2022.
Office Action for corresponding CN Application No. 201980094424. X, 24 pages dated Jan. 31, 2024.

* cited by examiner

IMAGE TRANSMISSION/RECEPTION SYSTEM, IMAGE TRANSMISSION APPARATUS, IMAGE RECEPTION APPARATUS, IMAGE TRANSMISSION/RECEPTION METHOD, AND PROGRAM

TECHNICAL FIELD

The present invention relates to an image transmission/reception system, an image transmission apparatus, an image reception apparatus, an image transmission/reception method, and a program.

BACKGROUND ART

In the cloud gaming service technology, which has attracted attention in recent years, when a user playing a video game operates a terminal capable of communicating with a cloud server configured to run the program of the video game, an operation signal based on the operation is transmitted from the terminal to the cloud server. Then, the cloud server executes video game processing including processing based on the operation signal, to thereby generate a play image depicting the situation in the video game. Then, the cloud server transmits image data based on the play image to the terminal, and the terminal displays an image generated on the basis of the image data. This series of processing stages is repeatedly executed, so that a moving image depicting the situation in the video game is displayed on the terminal.

SUMMARY

Technical Problem

As the frequency of image data transmission from the cloud server to the terminal increases, a higher frame rate and smoother moving image can be displayed on the terminal, but the traffic between the cloud server and the terminal increases.

Here, to reduce the traffic while preventing a drop in smoothness of displayed moving images, it is conceivable to reduce the transmission frequency of image data and to generate, as for image data that is not transmitted, images by estimating images to be generated on the basis of the image data in question in the terminal.

However, for example, in a case where there is a sudden scene switch between play images or a case where a generated play image includes objects that have not appeared in the past, it is difficult for the terminal to estimate images to be generated on the basis of image data that is not transmitted. In such a case, there is a risk that a false moving image different from an image supposed to be displayed is displayed. Note that, this holds true not only for cloud gaming services, but also for the general transmission of data based on images.

The present invention has been made in view of the above-mentioned circumstance and has an object to provide an image transmission/reception system, an image transmission apparatus, an image reception apparatus, an image transmission/reception method, and a program that achieve a reduction in image data traffic while reducing the risk that a false moving image different from an image supposed to be displayed is displayed.

Solution to Problem

In order to solve the above-mentioned problem, according to the present invention, there is provided an image transmission/reception system including an image transmission apparatus and an image reception apparatus. The image transmission apparatus includes an image generation unit configured to generate a first image and generate a second image after generating the first image, an image data transmission unit configured to transmit first image data generated on the basis of the first image, and a transmission control unit configured to control whether or not to transmit second image data generated on the basis of the second image. The image reception apparatus includes an image data reception unit configured to receive the first image data, a to-be-displayed image generation unit configured to generate a first to-be-displayed image on the basis of the first image data, an alternative image generation unit configured to generate an alternative image by estimating, on the basis of the first image data, a second to-be-displayed image to be generated on the basis of the second image data by the to-be-displayed image generation unit, and a display control unit configured to display, after displaying the first to-be-displayed image, any one of the second to-be-displayed image generated on the basis of the second image data and the alternative image, depending on whether or not reception of the second image data has succeeded. The transmission control unit controls whether or not to transmit the second image data on the basis of a possibility of successful estimation of the second to-be-displayed image on the basis of the first image data by the alternative image generation unit.

In an aspect of the present invention, the transmission control unit controls whether or not to transmit the second image data on the basis of the possibility of successful estimation of the second to-be-displayed image on the basis of the first image data by the alternative image generation unit, the possibility being determined on the basis of a feature amount of the first image and a feature amount of the second image.

In this aspect, the transmission control unit may control whether or not to transmit the second image data on the basis of the possibility of successful estimation of the second to-be-displayed image on the basis of the first image data by the alternative image generation unit, the possibility being determined on the basis of a chronological order of feature amounts including the feature amount of the first image and the feature amount of the second image.

Further, in an aspect of the present invention, the transmission control unit controls, on the basis of the possibility of successful estimation of the second to-be-displayed image on the basis of the first image data by the alternative image generation unit, the possibility being determined on the basis of a feature amount that includes a parameter that is used for encoding a downscaled image obtained by downscaling the second image, whether or not to transmit the second image data indicating the downscaled image.

Alternatively, the image data transmission unit transmits the first image data indicating a first downscaled image obtained by downscaling the first image, and the transmission control unit controls, on the basis of the possibility of successful estimation of the second to-be-displayed image on the basis of the first image data by the alternative image generation unit, the possibility being determined on the basis of a feature amount that includes a parameter that is used for encoding the first downscaled image and a feature amount that includes a parameter that is used for encoding a second downscaled image obtained by downscaling the second image, whether or not to transmit the second image data indicating the second downscaled image.

Here, the feature amount may indicate at least any one of pieces of information indicating a feature point of an image, an edge strength of the image, a depth of a pixel included in the image, a texture type of the image, an optical flow in the image, and a moving direction and a speed of a rectangular region in the image.

Further, the transmission control unit may perform control of giving priority to transmission of feature amount data indicating the feature amount to the image reception apparatus over transmission of image data indicating an image.

Further, in an aspect of the present invention, the transmission control unit controls whether or not to transmit the second image data on the basis of whether or not the second image includes a key frame.

Further, in an aspect of the present invention, the transmission control unit controls whether or not to transmit the second image data on the basis of whether or not a scene in the second image is switched from a scene in the first image.

Further, in an aspect of the present invention, the transmission control unit controls whether or not to transmit the second image data on the basis of whether or not the second image includes an image of an object that does not appear in the first image.

Further, in an aspect of the present invention, the alternative image generation unit starts generation of the alternative image on the basis of the first image data before whether or not the reception of the second image data has succeeded is checked.

Further, in an aspect of the present invention, the transmission control unit performs, in a case where a transmission speed of the image transmission apparatus is higher than a predetermined speed, control of transmitting the second image data, irrespective of the possibility of successful estimation of the second to-be-displayed image on the basis of the first image data by the alternative image generation unit.

Further, according to the present invention, there is provided an image transmission apparatus including: an image generation unit configured to generate a first image and generate a second image after generating the first image; an image data transmission unit configured to transmit first image data generated on the basis of the first image to an image reception apparatus, the image reception apparatus including an image data reception unit configured to receive the first image data, a to-be-displayed image generation unit configured to generate a first to-be-displayed image on the basis of the first image data, an alternative image generation unit configured to generate an alternative image by estimating, on the basis of the first image data, a second to-be-displayed image to be generated on the basis of second image data generated on the basis of the second image by the to-be-displayed image generation unit, and a display control unit configured to display, after displaying the first to-be-displayed image, any one of the second to-be-displayed image generated on the basis of the second image data and the alternative image, depending on whether or not reception of the second image data has succeeded; and a transmission control unit configured to control whether or not to transmit the second image data generated on the basis of the second image to the image reception apparatus on the basis of a possibility of successful estimation of the second to-be-displayed image on the basis of the first image data by the alternative image generation unit.

Further, according to the present invention, there is provided an image reception apparatus including an image data reception unit configured to receive first image data from an image transmission apparatus, a to-be-displayed image generation unit configured to generate a first to-be-displayed image on the basis of the first image data; an alternative image generation unit configured to generate an alternative image by estimating, on the basis of the first image data, a second to-be-displayed image to be generated on the basis of second image data by the to-be-displayed image generation unit, and a display control unit configured to display, after displaying the first to-be-displayed image, any one of the second to-be-displayed image generated on the basis of the second image data and the alternative image, depending on whether or not reception of the second image data has succeeded, whether or not to transmit the second image data being controlled by the image transmission apparatus on the basis of a possibility of successful estimation of the second to-be-displayed image on the basis of the first image data by the alternative image generation unit.

Further, according to the present invention, there is provided an image transmission/reception method including: by an image transmission apparatus, a first image generation step of generating a first image; by the image transmission apparatus, a second image generation step of generating a second image after generating the first image; by the image transmission apparatus, an image data transmission step of transmitting first image data generated on the basis of the first image; by the image transmission apparatus, a transmission control step of controlling whether or not to transmit second image data generated on the basis of the second image; by an image reception apparatus, an image data reception step of receiving the first image data; by the image reception apparatus, a to-be-displayed image generation step of generating a first to-be-displayed image on the basis of the first image data; by the image reception apparatus, an alternative image generation step of generating an alternative image by estimating, on the basis of the first image data, a second to-be-displayed image to be generated on the basis of the second image data in the to-be-displayed image generation step; and by the image reception apparatus, a display control step of displaying, after displaying the first to-be-displayed image, any one of the second to-be-displayed image generated on the basis of the second image data and the alternative image, depending on whether or not reception of the second image data has succeeded. In the transmission control step, the image transmission apparatus controls whether or not to transmit the second image data on the basis of a possibility of successful estimation of the second to-be-displayed image on the basis of the first image data in the alternative image generation step.

Further, according to the present invention, there is provided a program for causing a computer to execute: a first image generation procedure of generating a first image; a second image generation procedure of generating a second image after generating the first image; an image data transmission procedure of transmitting first image data generated on the basis of the first image to an image reception apparatus, the image reception apparatus including an image data reception unit configured to receive the first image data, a to-be-displayed image generation unit configured to generate a first to-be-displayed image on the basis of the first image data, an alternative image generation unit configured to generate an alternative image by estimating, on the basis of the first image data, a second to-be-displayed image to be generated on the basis of second image data generated on the basis of the second image by the to-be-displayed image generation unit, and a display control unit configured to display, after displaying the first to-be-displayed image, any one of the second to-be-displayed image generated on the basis of the second image data and the alternative image, depending on whether or not reception of the second image data has succeeded; and a transmission control procedure of controlling whether or not to transmit the second image data generated on the basis of the second image to the image reception apparatus on the basis of a possibility of successful estimation of the second to-be-displayed image on the basis of the first image data by the alternative image generation unit.

Further, according to the present invention, there is provided another program for causing a computer to execute an image data reception procedure of receiving first image data from an image transmission apparatus, a to-be-displayed image generation procedure of generating a first to-be-displayed image on the basis of the first image data, an alternative image generation procedure of generating an alternative image by estimating, on the basis of the first image data, a second to-be-displayed image to be generated on the basis of second image data in the to-be-displayed image generation procedure, and a display control procedure of displaying, after displaying the first to-be-displayed image, any one of the second to-be-displayed image generated on the basis of the second image data and the alternative image, depending on whether or not reception of the second image data has succeeded, whether or not to transmit the second image data being controlled by the image transmission apparatus on the basis of a possibility of successful estimation of the second to-be-displayed image on the basis of the first image data in the alternative image generation procedure.

DESCRIPTION OF EMBODIMENT

Figure 1:
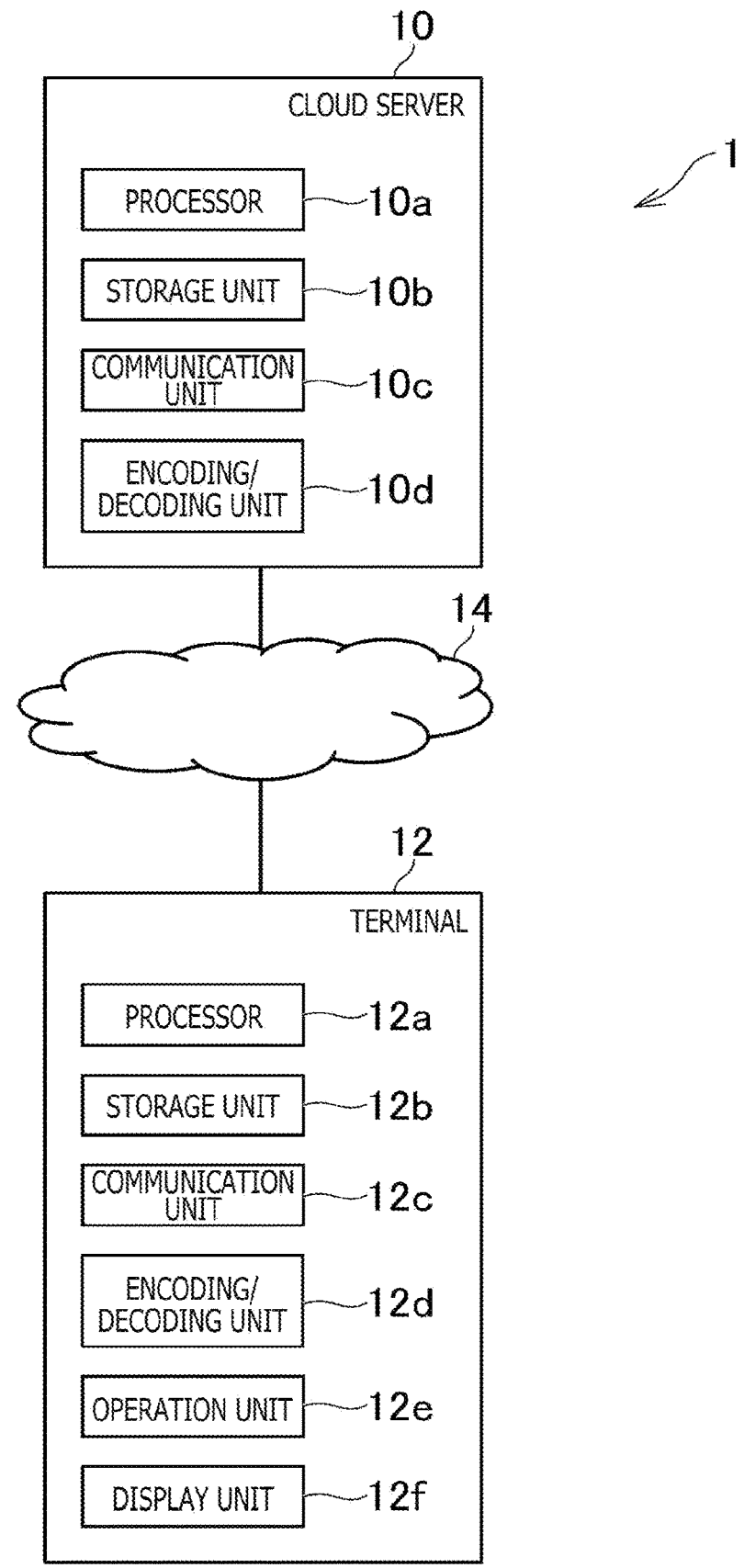
FIG. 1 is a diagram illustrating an exemplary overall configuration of a cloud gaming system according to an embodiment of the present invention.

FIG. 1 is a diagram illustrating an exemplary overall configuration of a cloud gaming system 1 according to an embodiment of the present invention. As illustrated in FIG. 1, the cloud gaming system 1 according to the present embodiment includes a cloud server 10 and a terminal 12 which each mainly include a computer. The cloud server 10 and the terminal 12 are connected to a computer network 14 such as the Internet, so that the cloud server 10 and the terminal 12 can communicate with each other.

The cloud server 10 according to the present embodiment is, for example, a server computer configured to execute a video game program based on a cloud gaming service. The cloud server 10 delivers a moving image depicting the situation in the video game to the terminal 12 used by a user playing the video game.

As illustrated in FIG. 1, the cloud server 10 includes, for example, a processor 10a, a storage unit 10b, a communication unit 10c, and an encoding/decoding unit 10d.

The processor 10a is, for example, a program control device such as a central processing unit (CPU), and executes various types of information processing according to programs stored in the storage unit 10b. The processor 10a according to the present embodiment also includes a graphics processing unit (GPU) configured to draw images in a frame buffer on the basis of graphic commands or data supplied from the CPU.

The storage unit 10b is, for example, a storage element, such as a read only memory (ROM) or a random access memory (RAM), or a hard disk drive. The storage unit 10b stores, for example, programs that are executed by the processor 10a. Further, the storage unit 10b according to the present embodiment has the frame buffer area in which the GPU included in the processor 10a draws images.

The communication unit 10c is, for example, a communication interface for transmitting/receiving data to/from computers such as the terminal 12 via the computer network 14.

The encoding/decoding unit 10d includes, for example, an encoder configured to encode images to generate image data and a decoder configured to decode image data to generate images.

The terminal 12 according to the present embodiment is, for example, a computer used by the user who uses the cloud gaming service, such as a video game console, a personal computer, a tablet device, or a smartphone.

As illustrated in FIG. 1, the terminal 12 includes, for example, a processor 12a, a storage unit 12b, a communication unit 12c, an encoding/decoding unit 12d, an operation unit 12e, and a display unit 12f.

The processor 12a is, for example, a program control device such as a CPU, and executes various types of information processing according to programs stored in the storage unit 12b. The processor 12a according to the present embodiment also includes a GPU configured to draw images in a frame buffer on the basis of graphic commands or data supplied from the CPU.

The storage unit 12b is, for example, a storage element, such as a ROM or a RAM, or a hard disk drive. The storage unit 12b stores, for example, programs that are executed by the processor 12a. Further, the storage unit 12b according to the present embodiment has the frame buffer area in which the GPU included in the processor 12a draws images.

The communication unit 12c is, for example, a communication interface for transmitting/receiving data to/from computers such as the cloud server 10 via the computer network 14.

The encoding/decoding unit 12d includes, for example, an encoder and a decoder. The encoder encodes input images to generate image data indicating the images. Further, the decoder decodes input image data to output images indicated by the image data.

The operation unit 12e is, for example, an operation member for operation input to the processor 12a.

The display unit 12f is, for example, a display device such as a liquid crystal display or an organic electroluminescent (EL) display.

When video game-related operation is performed through the operation unit 12e, the terminal 12 according to the present embodiment transmits an operation signal indicating the operation to the cloud server 10. Then, the cloud server 10 executes video game processing according to the operation signal. Then, a play image depicting the situation in the video game affected by the operation signal is generated. In the present embodiment, the video game processing and the play image generation are executed at a predetermined frame rate (for example, 60 fps). Note that, in the present embodiment, the video game processing and the play image generation may be executed at a variable frame rate.

Here, in the present embodiment, not image data indicating the play image, but image data indicating an image obtained by downscaling the play image is transmitted from the cloud server 10 to the terminal 12. In the following, play images before downscaling are referred to as "original images," and images obtained by downscaling original images are referred to as "downscaled images." Here, the original image may be a 4K image, and the downscaled image may be a 2K image.

Then, the terminal 12 generates, on the basis of the image data received from the cloud server 10, an image at a higher resolution than the downscaled image described above. In the following, images generated in such a way at a higher resolution than downscaled images are referred to as "upscaled images." Then, the upscaled image is displayed on the display unit 12f of the terminal 12. This series of processing stages is repeatedly executed, so that a moving image including the series of upscaled images is displayed on the terminal 12.

As the frequency of image data transmission from the cloud server 10 to the terminal 12 increases, a higher frame rate and smoother moving image can be displayed on the terminal 12, but the traffic between the cloud server 10 and the terminal 12 increases.

Here, to reduce the traffic while preventing a drop in smoothness of displayed moving images, it is conceivable to reduce the transmission frequency of image data and to generate, as for image data that is not transmitted, images by estimating images to be generated on the basis of the image data in question in the terminal 12 (hereinafter referred to as "alternative images").

However, for example, in a case where there is a sudden scene switch between play images or a case where a generated play image includes objects that have not appeared in the past, it is difficult for the terminal 12 to estimate images to be generated on the basis of image data that is not transmitted. In such a case, there is a risk that a false moving image different from an image supposed to be displayed is displayed.

Accordingly, in the present embodiment, as described below, the transmission of image data is controlled on the basis of the possibility that the terminal 12 successfully estimates the above-mentioned images to be generated, so that the image data traffic can be reduced while the risk that a false moving image different from an image supposed to be displayed is displayed is reduced.

Now, the function of the cloud gaming system 1 and processing that is executed in the cloud gaming system 1 according to the present embodiment are further described mainly in terms of image data transmission control processing.

Figure 2:
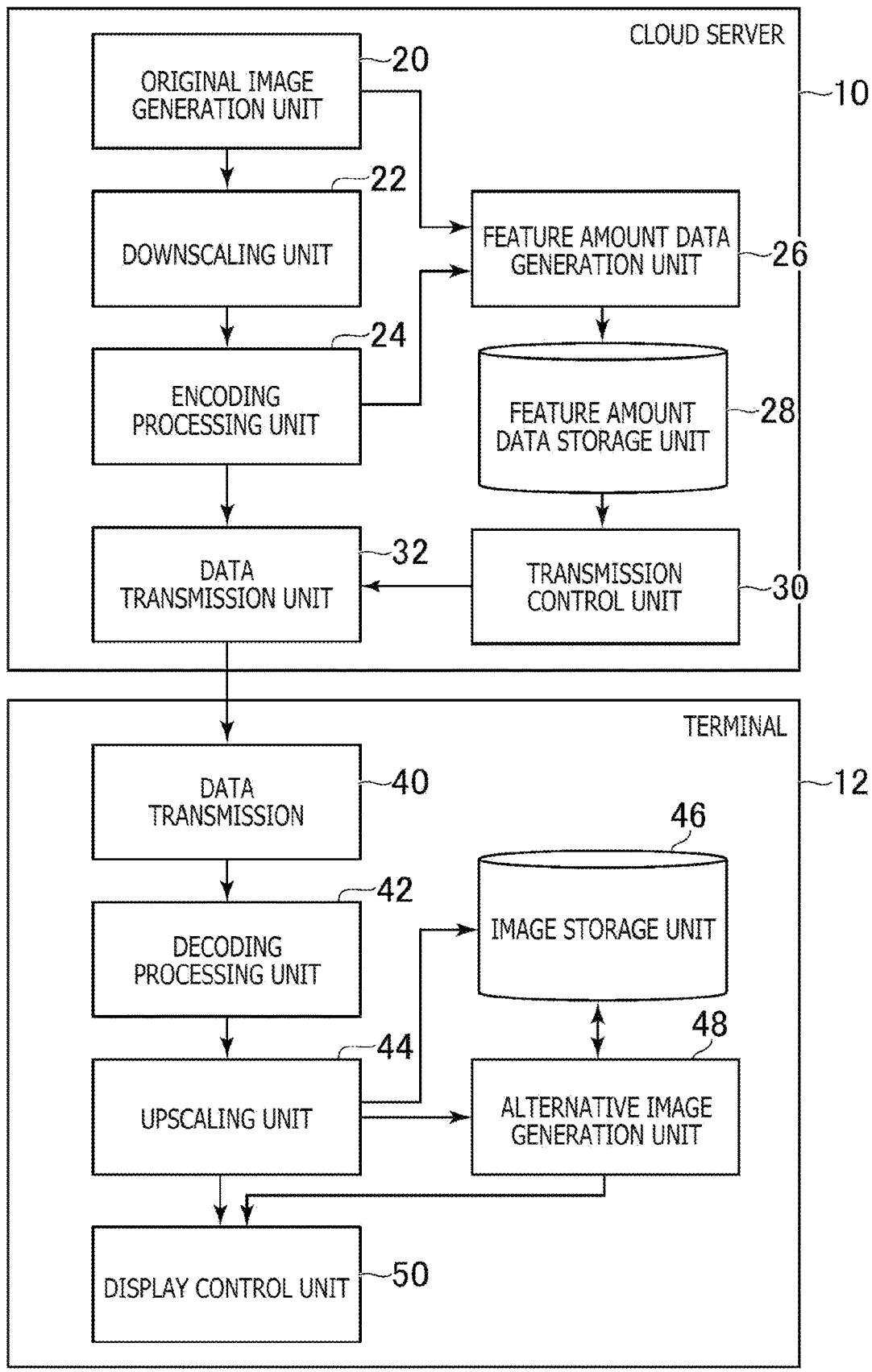
FIG. 2 is a functional block diagram illustrating exemplary functions that are implemented in the cloud gaming system according to the embodiment of the present invention.

FIG. 2 is a functional block diagram illustrating exemplary functions that are implemented in the cloud gaming system 1 according to the present embodiment. Note that, in the cloud gaming system 1 according to the present embodiment, all the functions illustrated in FIG. 2 are not necessarily implemented, and functions other than the functions illustrated in FIG. 2 (for example, a video game processing function based on operation signals or the like) may be implemented.

As illustrated in FIG. 2, the cloud server 10 according to the present embodiment functionally includes, for example, an original image generation unit 20, a downscaling unit 22, an encoding processing unit 24, a feature amount data generation unit 26, a feature amount data storage unit 28, a transmission control unit 30, and a data transmission unit 32.

The original image generation unit 20, the downscaling unit 22, and the transmission control unit 30 are implemented mainly with the processor 10a. The encoding processing unit 24 is implemented mainly with the encoding/decoding unit 10d. The feature amount data generation unit 26 is implemented mainly with the processor 10a and the storage unit 10b. The feature amount data storage unit 28 is implemented mainly with the storage unit 10b. The data transmission unit 32 is implemented mainly with the communication unit 10c. The cloud server 10 of the present embodiment plays a role as an image transmission apparatus configured to transmit image data.

The above-mentioned functions are implemented by the processor 10a executing a program including instructions corresponding to the above-mentioned functions, which has been installed on the cloud server 10 that is the computer. The program is supplied to the cloud server 10 through a computer readable information storage medium such as an optical disc, a magnetic disk, a magnetic tape, a magneto-optical disk, or a flash memory, or via the Internet, for example.

Further, as illustrated in FIG. 2, the terminal 12 according to the present embodiment functionally includes, for example, a data reception unit 40, a decoding processing unit 42, an upscaling unit 44, an image storage unit 46, an alternative image generation unit 48, and a display control unit 50. The data reception unit 40 is implemented mainly with the communication unit 12c. The decoding processing unit 42 is implemented mainly with the encoding/decoding unit 12d. The upscaling unit 44 and the alternative image generation unit 48 are implemented mainly with the processor 12a and the storage unit 12b. The image storage unit 46 is implemented mainly with the storage unit 12b. The display control unit 50 is implemented mainly with the processor 12a and the display unit 12f. The terminal 12 of the present embodiment plays a role as an image reception apparatus configured to receive image data.

The above-mentioned functions are implemented by the processor 12a executing a program including instructions corresponding to the above-mentioned functions, which has been installed on the terminal 12 that is the computer. The program is supplied to the terminal 12 through a computer readable information storage medium such as an optical disc, a magnetic disk, a magnetic tape, a magneto-optical disk, or a flash memory, or via the Internet, for example.

The original image generation unit 20 of the present embodiment generates, for example, the above-mentioned original image. As described above, the original image is, for example, a play image depicting the situation in a video game.

The downscaling unit 22 of the present embodiment generates, for example, downscaled images by downscaling original images generated by the original image generation unit 20.

The encoding processing unit 24 of the present embodiment generates, for example, image data indicating downscaled images obtained by downscaling original images. For example, the encoding processing unit 24 encodes a downscaled image generated by the downscaling unit 22, to generate image data indicating the downscaled image. Here, in the encoding of the downscaled image, the downscaled image may be compressed, so that image data smaller than the downscaled image may be generated. Examples of the encoding method that is used for downscaled image encoding include MPEG-4 Advanced Video Coding (AVC)/H.264/ and High Efficiency Video Coding (HEVC)/H265.

The feature amount data generation unit 26 of the present embodiment generates, for example, feature amount data indicating at least one of the feature amount of an original image generated by the original image generation unit 20 and a feature amount corresponding to parameters that are used for downscaled image encoding. The feature amount data is data unidentifiable only from image data indicating downscaled images.

Then, the feature amount data generation unit 26 of the present embodiment stores, for example, the generated feature amount data in the feature amount data storage unit 28. Here, for example, the feature amount data may be stored in the feature amount data storage unit 28 in association with a timestamp indicating a timing at which the feature amount data has been generated, information indicating the position of the feature amount data in the generation order, or the like. In such a way, in the present embodiment, with regard to each of the plurality of pieces of feature amount data stored in the feature amount data storage unit 28, a timing at which the feature amount data has been generated and the position of the feature amount data in the generation order are identifiable.

Here, the feature amount described above may indicate at least one of pieces of information indicating the feature points or the edge strength of an original image, the depth of each pixel included in the original image, the texture type or the optical flow of the original image, and the moving direction and the speed of a rectangular region in the image. For example, the feature amount data generation unit 26 may extract the feature amount of an original image to generate feature amount data indicating the extracted feature amount. The feature amount data may include, for example, data indicating the texture type of the original image (for example, data indicating the positions of edge regions, flat regions, high density regions, detail regions, and crowd regions). Further, the feature amount data may include data indicating the positions of Harris corner feature points or the edge strength of the original image. Further, the feature amount data may include data indicating the optical flow in the original image. Further, the feature amount data may include depth data indicating the depth of each pixel included in the original image.

Further, the feature amount data generation unit 26 may execute object recognition processing on an original image. Moreover, feature amount data may include data indicating the feature amount of the original image including data indicating objects in the original image identified by the object recognition processing.

Further, the feature amount data generation unit 26 may generate feature amount data indicating a feature amount corresponding to parameters that are used for encoding by the encoding processing unit 24. The feature amount data may include, for example, motion estimation (ME) information data indicating the moving direction and the speed of a rectangular region in an image. Further, the feature amount data may include data on CU unit allocation information in units of CU unit size indicating positions to which CU units in the CU unit size have been allocated. Further, the feature amount data may include data indicating a Region of Interest (ROI) that is a region to which a high bit rate has been allocated to achieve a higher image quality. Further, the feature amount data may include data indicating quantization parameter values. Further, the feature amount data may include data indicating whether or not there is a scene switch or data indicating whether or not a frame is a key frame (I frame).

Further, for example, the feature amount data generation unit 26 may generate feature amount data indicating the feature amount of an original image and a feature amount corresponding to parameters that are used for encoding by the encoding processing unit 24. Further, for example, the feature amount data generation unit 26 may generate feature amount data including data generated on the basis of data indicating the feature amount of an original image and data indicating a feature amount corresponding to parameters that are used for encoding by the encoding processing unit 24. For example, the feature amount data generation unit 26 may decide whether or not to execute super-resolution processing on the basis of data indicating the feature amount of an original image and data indicating a feature amount corresponding to parameters that are used for encoding by the encoding processing unit 24. Then, the feature amount data generation unit 26 may generate feature amount data including data indicating whether or not to execute the super-resolution processing.

The feature amount data storage unit 28 of the present embodiment stores, for example, feature amount data generated by the feature amount data generation unit 26.

The transmission control unit 30 of the present embodiment controls, for example, whether or not to transmit image data generated by the encoding processing unit 24 to the terminal 12. Here, for example, the transmission control unit 30 controls the data transmission unit 32 to control whether or not to transmit image data to the terminal 12.

The data transmission unit 32 of the present embodiment transmits, for example, image data generated by the encoding processing unit 24 to the terminal 12. In the present embodiment, the data transmission unit 32 transmits or does not transmit image data to the terminal 12 depending on the control of the transmission control unit 30. Here, the data transmission unit 32 may discard image data not to be transmitted to the terminal 12.

The data reception unit 40 of the present embodiment receives, for example, the above-mentioned image data transmitted from the cloud server 10.

In the present embodiment, the image data transmission by the data transmission unit 32 and the image data reception by the data reception unit 40 are repeatedly executed.

The decoding processing unit 42 of the present embodiment decodes, for example, image data received by the data reception unit 40, to generate images. In the following, images generated in such a way are referred to as "decoded images." In the present embodiment, the decoded image is an image at the same resolution as the downscaled image (for example, 2K image). In a case where downscaled images are encoded in an irreversible manner, decoded images are generally not identical to the downscaled images.

The upscaling unit 44 of the present embodiment generates, for example, on the basis of image data received by the data reception unit 40, to-be-displayed images that are displayed on the display unit 12f. Here, for example, as to-be-displayed images, upscaled images at a higher resolution than downscaled images generated by the downscaling unit 22 are generated. The upscaled image may be an image at the same resolution as the original image (for example, 4K image). In the present embodiment, on the basis of image data based on an original image, a to-be-displayed image that is the same as or similar to the original image is generated. The details of the upscaled image generation processing are described later.

The image storage unit 46 of the present embodiment stores, for example, images generated in the terminal 12. Here, the image storage unit 46 may store upscaled images generated by the upscaling unit 44. Further, the image storage unit 46 may store alternative images generated by the alternative image generation unit 48, which are described below.

The alternative image generation unit 48 of the present embodiment generates, for example, on the basis of first image data received at a first timing, an alternative image corresponding to second image data scheduled to be received at a second timing that comes after the first timing. For example, it is assumed that the original image generation unit 20 generates a first original image and, after generating the first original image, generates a second original image. Then, first image data is generated on the basis of the first original image, and second image data is generated on the basis of the second original image. In this case, the alternative image generation unit 48 may generate, on the basis of the first image data, an alternative image by estimating an upscaled image to be generated by the upscaling unit 44 on the basis of the second image data. Further, the alternative image generation unit 48 may generate an alternative image by estimating the second original image on the basis of the first image data.

Here, the alternative image generation unit 48 of the present embodiment may start the generation of the alternative image corresponding to the second image data on the basis of the first image data before whether or not the reception of the second image data has succeeded is checked, for example. Here, for example, on the basis of received first image data, an alternative image corresponding to second image data scheduled to be received next to the first image data may be generated. The alternative image may be an image at a higher resolution than the downscaled image (for example, an image at the same resolution as the upscaled image (for example, 4K image)). The details of the alternative image generation processing are described later.

The display control unit 50 of the present embodiment displays, for example, a first to-be-displayed image generated on the basis of first image data. After that, the display control unit 50 of the present embodiment displays, for example, depending on whether the reception of second image data has succeeded, any one of a second to-be-displayed image generated on the basis of the second image data and an alternative image based on the first image data. Here, for example, the display control unit 50 may display, depending on whether or not the reception of second image data has succeeded, any one of a second to-be-displayed image generated on the basis of the second image data and an alternative image generated on the basis of the first image data described above. Here, for example, the display control unit 50 causes the display unit 12f of the terminal 12 to display any one of an upscaled image and an alternative image.

Figure 3:
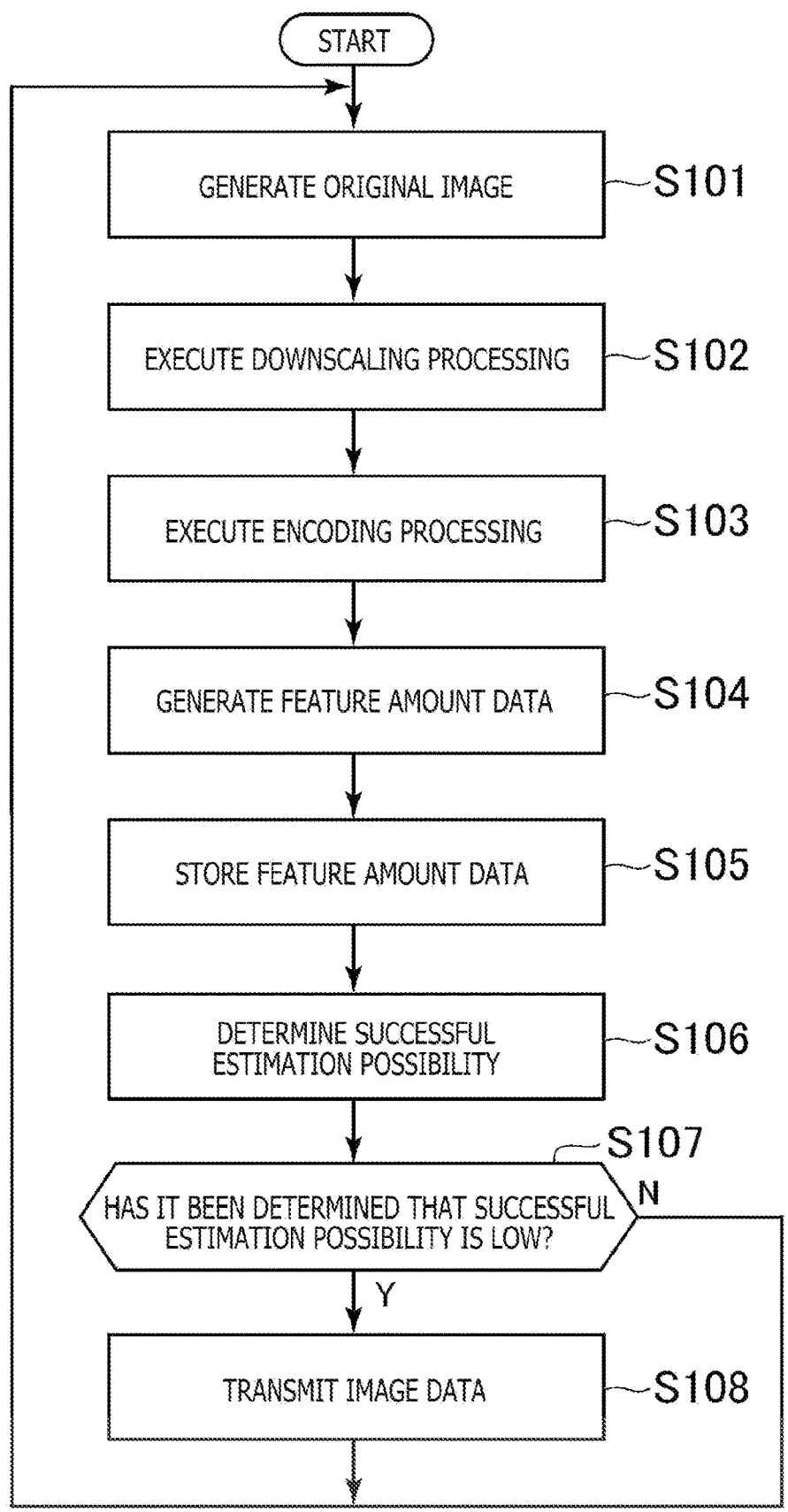
FIG. 3 is a flow chart illustrating an exemplary flow of processing that is performed in a cloud server according to the embodiment of the present invention.

Here, an exemplary flow of image data generation and transmission processing that is executed in the cloud server 10 according to the present embodiment is described with reference to the flow chart of FIG. 3. The processing in S101 to S108 illustrated in FIG. 3 is repeatedly executed at a predetermined frame rate (for example, 60 fps). Note that, the processing in S101 to S108 may be repeatedly executed at a variable frame rate.

First, the original image generation unit 20 generates an original image in a frame (S101). Here, as described above, an original image in the frame depicting the situation in a video game affected by an operation signal received from the terminal 12 may be generated.

Then, the downscaling unit 22 executes downscaling processing on the original image generated in the processing in S101, to generate a downscaled image (S102).

Then, the encoding processing unit 24 executes encoding processing on the downscaled image generated in the processing in S102, to generate image data (S103).

Then, the feature amount data generation unit 26 generates feature amount data (S104). In the processing in S104, for example, the feature amount data generation unit 26 may generate feature amount data indicating the feature amount of the original image generated in the processing in S101. Here, for example, feature amount data indicating a feature amount extracted from the original image generated in the processing in S101 may be generated. Further, for example, the feature amount data generation unit 26 may generate feature amount data indicating a feature amount corresponding to parameters that are used for the encoding in S103. Further, for example, the feature amount data generation unit 26 may generate feature amount data indicating both the feature amount extracted from the original image generated in the processing in S101 and the feature amount corresponding to the parameters that are used for the encoding in S103.

Then, the feature amount data generation unit 26 stores the feature amount data generated in the processing in S104 in the feature amount data storage unit 28 (S105).

Then, the transmission control unit 30 determines the possibility that the alternative image generation unit 48 succeeds in estimating an upscaled image in the frame on the basis of image data transmitted in the immediately preceding frame (S106). Here, an evaluation value indicating the possibility may be identified. For example, an evaluation value "1" may be identified in a case where the possibility of success is high, and an evaluation value "0" may be identified in a case where the possibility of success is low.

The transmission control unit 30 may identify the evaluation value "0" in a case where it is determined that there is a sudden scene switch between images or a generated image includes images of objects that have not appeared in the past, and may otherwise identify the evaluation value "1." Here, for example, the transmission control unit 30 may determine the above-mentioned possibility on the basis of the feature amount corresponding to the parameters that are used for downscaled image encoding in the frame, which is indicated by the feature amount data generated in the processing in S104. For example, the evaluation value "0" may be identified in a case where the feature amount data in the frame includes data indicating whether or not there is a scene switch or data indicating that the frame is a key frame (I frame), and otherwise the evaluation value "1" may be identified. Further, for example, the evaluation value "0" may be identified in a case where the size of the image data generated in the encoding processing is larger than a predetermined size, and otherwise the evaluation value "1" may be identified.

Further, the transmission control unit 30 may evaluate the above-mentioned possibility on the basis of, for example, first feature amount data that is feature amount data in the immediately preceding frame and second feature amount data that is feature amount data in the frame in question, which are stored in the feature amount data storage unit 28. Here, for example, the first feature amount data may be data indicating the feature amount of an original image in the immediately preceding frame, and the second feature amount data may be data indicating the feature amount of the original image in the frame in question. Further, the first feature amount data may be data indicating a feature amount corresponding to parameters that are used for downscaled image encoding in the immediately preceding frame. The second feature amount data may be data indicating a feature amount corresponding to parameters that are used for downscaled image encoding in the frame in question.

For example, the evaluation value "0" may be identified in a case where a difference between a histogram corresponding to the second feature amount data and a histogram corresponding to the first feature amount data is larger than a predetermined difference, and otherwise the evaluation value "1" may be identified. Further, for example, the evaluation value "0" may be identified in a case where objects indicated by the second feature amount data include objects not indicated by the first feature amount data, and otherwise the evaluation value "1" may be identified.

Then, the data transmission unit 32 checks whether or not it has been determined in the processing in S106 that the possibility that the alternative image generation unit 48 succeeds in estimating an alternative image on the basis of the image data transmitted in the immediately preceding frame is low (S107).

In a case where it has been determined that the possibility that the alternative image generation unit 48 succeeds in the estimation is high (for example, in a case where the evaluation value "1" is identified) (S107: N), the processing returns to the processing in S101. In this case, the data transmission unit 32 does not transmit the image data generated in the processing in S103 to the terminal 12.

In a case where it has been determined that the possibility that the alternative image generation unit 48 succeeds in the estimation is low (for example, in a case where the evaluation value "0" is identified) (S107: Y), the data transmission unit 32 transmits the image data generated in the processing in S103 to the terminal 12 (S108), and the processing returns to the processing in S101.

Here, in a case where the transmission speed of the cloud server 10 is higher than a predetermined speed, the transmission control unit 30 may perform control of transmitting the second image data, irrespective of the possibility of successful estimation of the second to-be-displayed image on the basis of the first image data. In this case, the data transmission unit 32 may transmit the second image data, irrespective of the possibility of successful estimation of the second to-be-displayed image on the basis of the first image data.

For example, the transmission control unit 30 may always measure the transmission speed of the cloud server 10 on the basis of the results of data transmission from the cloud server 10 to the terminal 12. Then, in a case where the current transmission speed is higher than the predetermined speed, the transmission control unit 30 may perform control of transmitting second image data, irrespective of the result of a determination in the processing in S106. In this case, the processing in S108 is executed irrespective of the determination result in the processing in S106.

As described above, the transmission control unit 30 may control, on the basis of the possibility of successful estimation of the second to-be-displayed image on the basis of the first image data by the alternative image generation unit 48, whether or not to transmit the second image data to the terminal 12.

The possibility of successful estimation of the second original image on the basis of the first image data by the terminal 12 may be determined on the basis of the feature amount of the first original image and the feature amount of the second original image. Alternatively, the possibility may be determined on the basis of a feature amount corresponding to parameters that are used for the encoding of a downscaled image obtained by downscaling the original image. For example, the possibility may be determined on the basis of the above-described feature amount of a downscaled image obtained by downscaling the first original image and the above-described feature amount of a downscaled image obtained by downscaling the second original image.

Further, in a case where the second image is a key frame, the possibility of successful estimation of the second to-be-displayed image on the basis of the first image data by the alternative image generation unit 48 is low. Based on this, the transmission control unit 30 may control, on the basis of whether or not the second image is a key frame, whether or not to transmit the second image data. In this case, whether or not the second image is a key frame may be determined on the basis of the second feature amount data described above.

Further, in a case where the scene in the second image is switched from the scene in the first image, the possibility of successful estimation of the second to-be-displayed image on the basis of the first image data by the alternative image generation unit 48 is low. Based on this, the transmission control unit 30 may control, on the basis of whether or not the scene in the second image is switched from the scene in the first image, whether or not to transmit the second image data. In this case, whether or not the scene in the second image is switched from the scene in the first image may be determined on the basis of the first image and the second image. Alternatively, whether or not the scene in the second image is switched from the scene in the first image may be determined on the basis of at least one of the first feature amount data and second feature amount data described above.

Further, in a case where the second image includes the images of objects that do not appear in the first image, the possibility of successful estimation of the second to-be-displayed image on the basis of the first image data by the alternative image generation unit 48 is low. Based on this, the transmission control unit 30 may control, on the basis of whether or not the second image includes the images of objects that do not appear in the first image, whether or not to transmit the second image data. In this case, whether or not the second image includes the images of objects that do not appear in the first image may be determined on the basis of the first image and the second image. Alternatively, whether or not the second image includes the images of objects that do not appear in the first image may be determined on the basis of at least one of the first feature amount data and second feature amount data described above.

Figure 4:
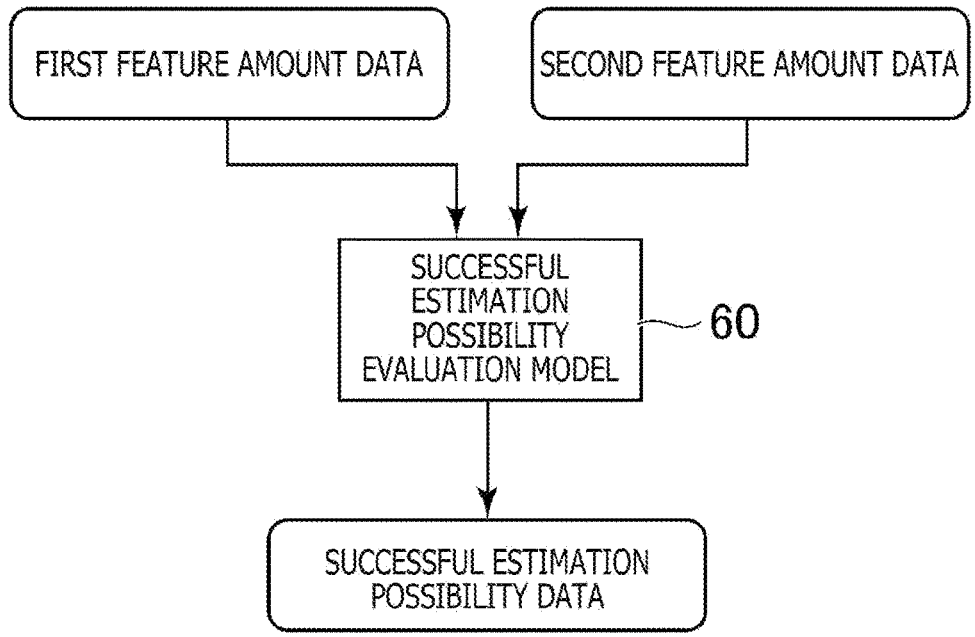
FIG. 4 is a diagram schematically illustrating an exemplary successful estimation possibility determination model.

Further, in the processing in S106 in the exemplary processing described above, the above-mentioned determination may be executed using a successful estimation possibility evaluation model 60 that is the trained machine learning model exemplified in FIG. 4. Here, the successful estimation possibility evaluation model 60 may employ deep learning. The successful estimation possibility evaluation model 60 may include the coupled topology information and coupling strength parameter information regarding the nodes included in the neural network.

In this case, the first feature amount data that is the feature amount data in the immediately preceding frame and the second feature amount data that is the feature amount data in the frame in question, which are stored in the feature amount data storage unit 28, are input to the successful estimation possibility evaluation model 60. Then, the successful estimation possibility evaluation model 60 outputs successful estimation possibility data based on the input. Here, for example, successful estimation possibility data having a value of 1 may be output in a case where the possibility of successful estimation is high, and successful estimation possibility data having a value of 0 may be output in a case where the possibility of successful estimation is low. Here, the successful estimation possibility evaluation model 60 is included in the transmission control unit 30, for example.

Figure 5:
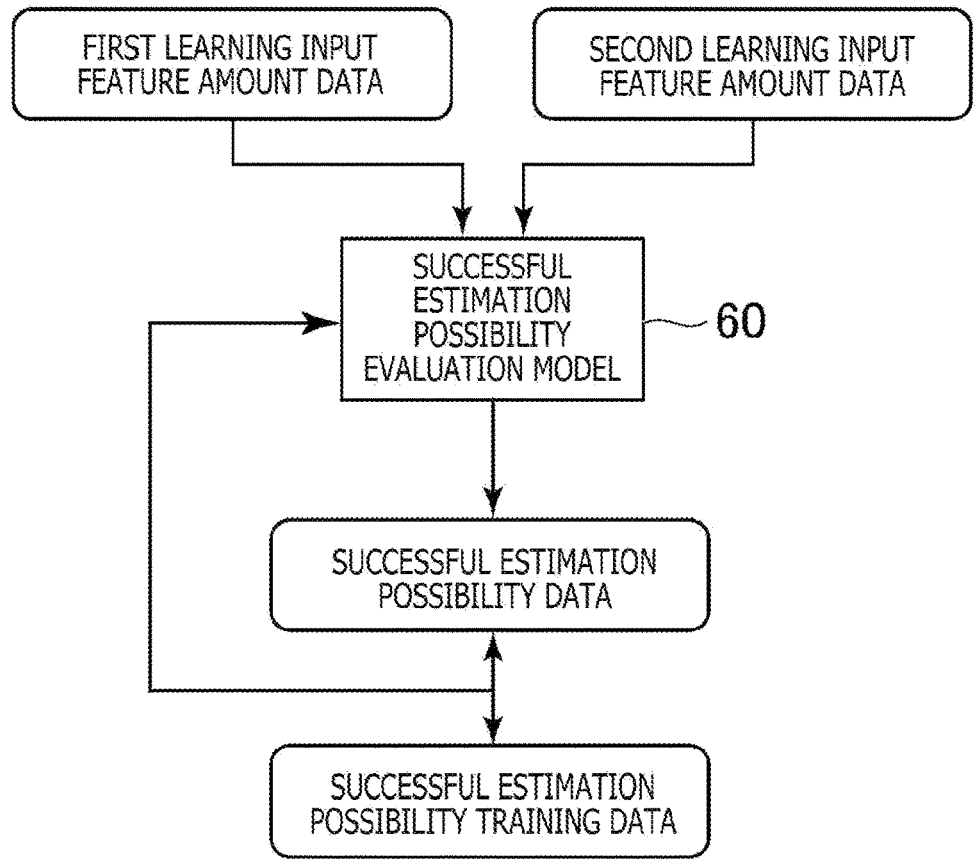
FIG. 5 is a diagram schematically illustrating exemplary learning of the successful estimation possibility determination model illustrated in FIG. 4.

FIG. 5 is a diagram schematically illustrating exemplary learning of the successful estimation possibility evaluation model 60 illustrated in FIG. 4. With the successful estimation possibility evaluation model 60, for example, learning using a plurality of pieces of learning data is executed. The learning data includes, for example, learning input data including first learning input feature amount data and second learning input feature amount data, and successful estimation possibility training data that is training data to be compared to successful estimation possibility data that is output from the successful estimation possibility evaluation model 60.

By processing similar to the processing described above, first learning input feature amount data that is feature amount data corresponding to a high-resolution image (for example, 4K image) serving as a first frame image included in a given moving image may be generated. Then, by processing similar to the processing described above, second learning input feature amount data that is feature amount data corresponding to a second frame image that is a frame image in the frame next to the first frame image in the above-mentioned given moving image may be generated. Then, learning input data including the first learning input feature amount data and the second learning input feature amount data may be generated.

Then, the user may decide the value of the successful estimation possibility training data corresponding to the learning input data. For example, the user may check, with his/her eyes, a comparison between the first frame image and the second frame image or a comparison between an alternative image generated by the alternative image generation unit 48 on the basis of the first frame image and the second frame image, to thereby decide the value of the successful estimation possibility training data. Further, for example, the user may decide the value of the successful estimation possibility training data by rule of thumb. Then, learning data including successful estimation possibility training data having a value decided in such a way, and learning input data corresponding to the successful estimation possibility training data may be generated.

With supervised learning using a plurality of pieces of learning data generated in such a way on the basis of many moving images and many frame images, the learning of the successful estimation possibility evaluation model 60 may be executed. For example, successful estimation possibility data that is output when the learning input data included in the learning data is input to the successful estimation possibility evaluation model 60 and the successful estimation possibility training data included in the learning data in question may be compared to each other. Then, on the basis of the result of the comparison, the parameters of the successful estimation possibility evaluation model 60 may be updated by back propagation, so that the learning of the successful estimation possibility evaluation model 60 may be executed.

Note that the learning of the successful estimation possibility evaluation model 60 is not limited to the method described above. For example, the learning of the successful estimation possibility evaluation model 60 may be executed by unsupervised learning or reinforcement learning.

Further, the successful estimation possibility evaluation model 60 may receive, as input, at least one of the original image in the immediately preceding frame that is the basis for the first feature amount data and the original image in the frame in question that is the basis for the second feature amount data. In this case, the learning of the successful estimation possibility evaluation model 60 may be executed using learning data including at least one of the first frame image and the second frame image, which correspond to an input to the successful estimation possibility evaluation model 60.

Figure 6:
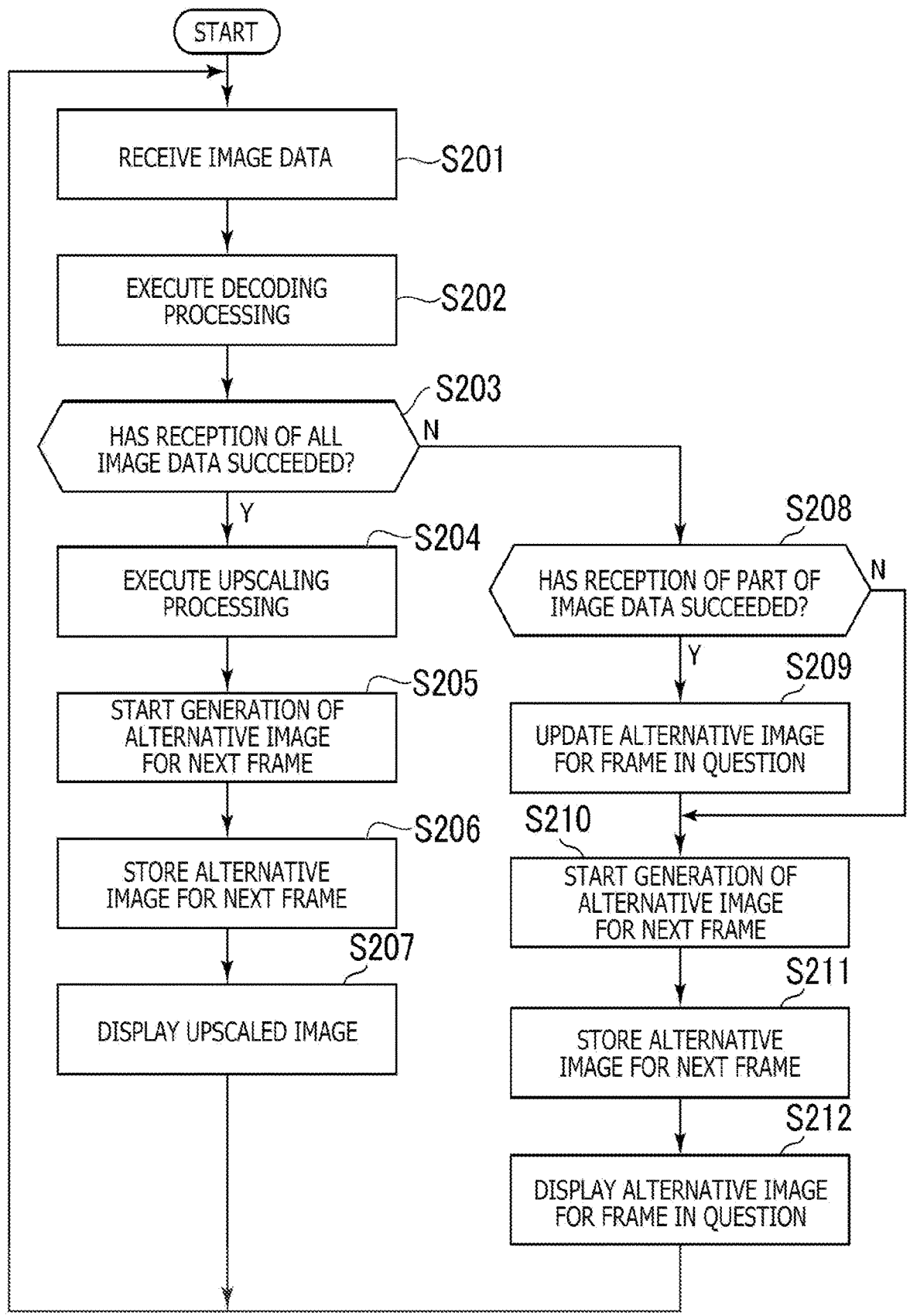
FIG. 6 is a flow chart illustrating an exemplary flow of processing that is performed in a terminal according to the embodiment of the present invention.

Next, an exemplary flow of upscaled image or alternative image display control processing that is executed in the terminal 12 according to the present embodiment is described with reference to the flow chart of FIG. 6. The processing in S201 to S212 illustrated in FIG. 6 is repeatedly executed at a predetermined frame rate (for example, 60 fps). Note that, the processing in S201 to S212 may be repeatedly executed at a variable frame rate.

First, the data reception unit 40 receives image data transmitted from the cloud server 10 in the processing in S108 (S201).

Then, the decoding processing unit 42 executes decoding processing on the image data received in the processing in S201, to generate a decoded image (S202).

Then, the upscaling unit 44 checks whether or not the reception of all the image data in the frame has succeeded (S203). In a case where the terminal 12 has not received the image data or in a case where the terminal 12 has only received the broken image data, it is confirmed in the processing in S203 that the reception of all the image data in the frame has failed. Further, in a case where no decoded image has been generated in the processing in S202, it may be confirmed in the processing in S203 that the reception of all the image data in the frame has failed. Further, here, in a case where the reception of all the image data has failed, the data reception unit 40 may notify the upscaling unit 44 of the failure of the reception of all the image data. Then, when the upscaling unit 44 receives the notification, it may be confirmed in the processing in S203 that the reception of all the image data in the frame has failed.

Figure 7:
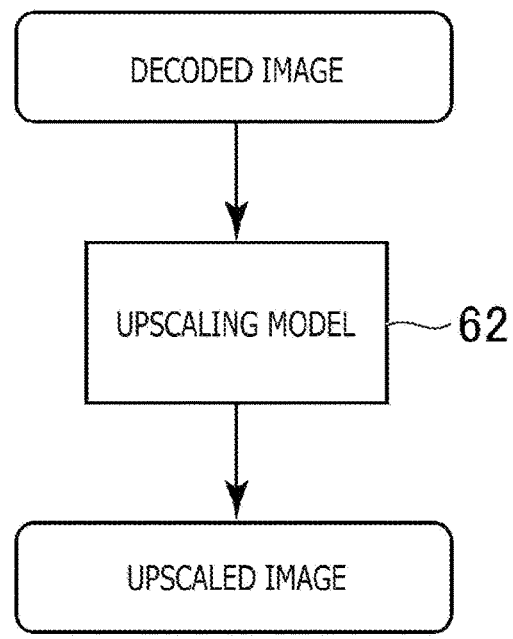
FIG. 7 is a diagram schematically illustrating an exemplary upscaling model.

It is assumed that it is confirmed in the processing in S203 that the reception of all the image data in the frame has succeeded (S203: Y). In this case, the upscaling unit 44 executes upscaling processing on the decoded image generated in the processing in S202, to generate an upscaled image (S204). Here, upscaling processing using an upscaling model 62 that is the trained machine learning model exemplified in FIG. 7 is executed. Here, the upscaling model 62 may employ deep learning. The upscaling model 62 may include the coupled topology information and coupling strength parameter information regarding the nodes included in the neural network.

In the processing in S204, for example, the decoded image in the frame generated in the processing in S202 is input to the upscaling model 62. Then, the upscaling model 62 outputs an upscaled image based on the input. Here, the upscaling model 62 is included in the upscaling unit 44, for example.

Figure 8:
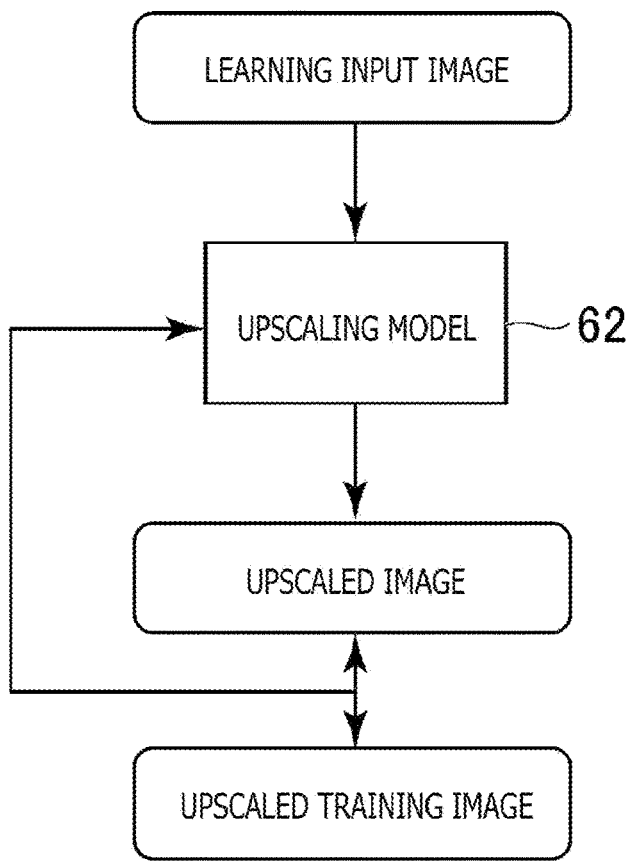
FIG. 8 is a diagram schematically illustrating exemplary learning of the upscaling model illustrated in FIG. 7.

FIG. 8 is a diagram schematically illustrating exemplary learning of the upscaling model 62 illustrated in FIG. 7. With the upscaling model 62, for example, learning using a plurality of pieces of learning data is executed. The learning data includes, for example, learning input data including a learning input image, and an upscaled training image that is training data to be compared to an upscaled image that is output from the upscaling model 62.

For example, by executing the downscaling processing described above, the encoding processing described above, and the decoding processing described above on a high-resolution image (for example, 4K image), a learning input image that is a low-resolution image (for example, 2K image) may be generated.

Then, learning data including the learning input image described above and an upscaled training image that is the high-resolution image described above may be generated. Then, with supervised learning using a plurality of pieces of learning data generated in such a way on the basis of many high-resolution images, the learning of the upscaling model 62 may be executed. For example, an upscaled image that is output when the learning input data included in the learning data is input to the upscaling model 62 and the upscaled training image included in the learning data in question may be compared to each other. Then, on the basis of the result of the comparison, the parameters of the upscaling model 62 may be updated by back propagation, so that the learning of the upscaling model 62 may be executed.

Note that the learning of the upscaling model 62 is not limited to the method described above. For example, the learning of the upscaling model 62 may be executed by unsupervised learning or reinforcement learning.

When the processing in S204 ends, the alternative image generation unit 48 starts the generation of an alternative image for the next frame on the basis of an image generated on the basis of the image data received in the processing in S201 as a fundamental image used for alternative image generation (S205). Here, for example, the upscaling unit 44 may store the upscaled image generated in the processing in S204 in the image storage unit 46 as a fundamental image. Further, for example, the upscaling unit 44 may store the decoded image generated in the processing in S202 in the image storage unit 46 as a fundamental image. Then, the alternative image generation unit 48 may start alternative image generation based on the fundamental image stored in the image storage unit 46.

Figure 9:
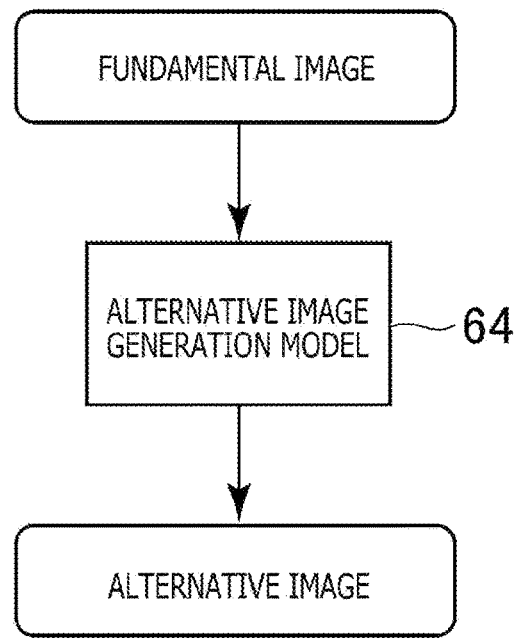
FIG. 9 is a diagram schematically illustrating an exemplary alternative image generation model.

Here, the execution of alternative image generation processing using an alternative image generation model 64 that is the trained machine learning model exemplified in FIG. 9 starts. Here, the alternative image generation model 64 may employ deep learning. The alternative image generation model 64 may include the coupled topology information and coupling strength parameter information regarding the nodes included in the neural network.

In the processing in S205, for example, the fundamental image stored in the image storage unit 46 in the frame is input to the alternative image generation model 64. Then, the alternative image generation model 64 outputs an alternative image based on the input. Here, the alternative image generation model 64 is included in the alternative image generation unit 48, for example.

Figure 10:
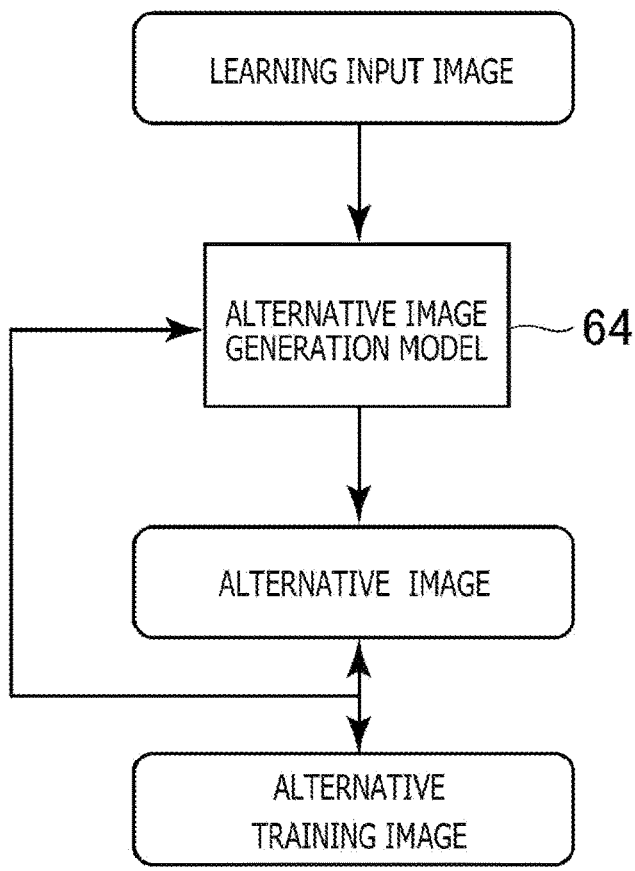
FIG. 10 is a diagram schematically illustrating exemplary learning of the alternative image generation model illustrated in FIG. 9.

FIG. 10 is a diagram schematically illustrating exemplary learning of the alternative image generation model 64 illustrated in FIG. 9. With the alternative image generation model 64, for example, learning using a plurality of pieces of learning data is executed. The learning data includes, for example, learning input data including a learning input image, and an alternative training image that is training data to be compared to an alternative image that is output from the alternative image generation model 64.

For example, it is assumed that the fundamental image is a decoded image. In this case, the downscaling processing described above, the encoding processing described above, and the decoding processing described above may be executed on a high-resolution image (for example, 4K image) that is a frame image included in a given moving image. With this, a learning input image that is a low-resolution image (for example, 2K image) may be generated. Further, for example, it is assumed that the fundamental image is an upscaled image. In this case, the downscaling processing described above, the encoding processing described above, the decoding processing described above, and the upscaling processing described above may be executed on a high-resolution image (for example, 4K image) that is a frame image included in the moving image. With this, a learning input image that is a high-resolution image may be generated.

Then, learning data that includes learning input data including the learning input image described above and that includes an alternative training image that is a frame image in the frame next to a frame image corresponding to the learning input image in the above-mentioned given moving image may be generated. Then, with supervised learning using a plurality of pieces of learning data generated in such a way on the basis of many moving images and many frame images, the learning of the alternative image generation model 64 may be executed. For example, an alternative image that is output when the learning input data included in the learning data is input to the alternative image generation model 64 and the alternative training image included in the learning data in question may be compared to each other. Then, on the basis of the result of the comparison, the parameters of the alternative image generation model 64 may be updated by back propagation, so that the learning of the alternative image generation model 64 may be executed.

Note that the learning of the alternative image generation model 64 is not limited to the method described above. For example, the learning of the alternative image generation model 64 may be executed by unsupervised learning or reinforcement learning.

Then, the alternative image generation unit 48 stores the alternative image for the next frame, which has been generated in the processing that had started in S205, in the image storage unit 46 (S206).

Then, the display control unit 50 causes the display unit 12f to display the upscaled image generated in the processing in S204 (S207), and the processing returns to the processing in S201.

It is assumed that it is confirmed in the processing in S203 that the reception of all the image data in the frame has failed (S203: N). In this case, the alternative image generation unit 48 checks whether or not the reception of part of the image data in the frame has succeeded (S208). In a case where part of the image data that the terminal 12 has received is broken, it is confirmed in the processing in S208 that the reception of part of the image data in the frame has failed. Further, in a case where the decoded image generated in the processing in S202 has missing part, it may be confirmed in the processing in S208 that the reception of part of the image data in the frame has failed. Further, here, in a case where the reception of part of the image data has failed, the data reception unit 40 may notify the alternative image generation unit 48 of the failure of the reception of part of the image data. Then, when the alternative image generation unit 48 receives the notification, it may be confirmed in the processing in S208 that the reception of part of the image data in the frame has failed.

Figure 11:
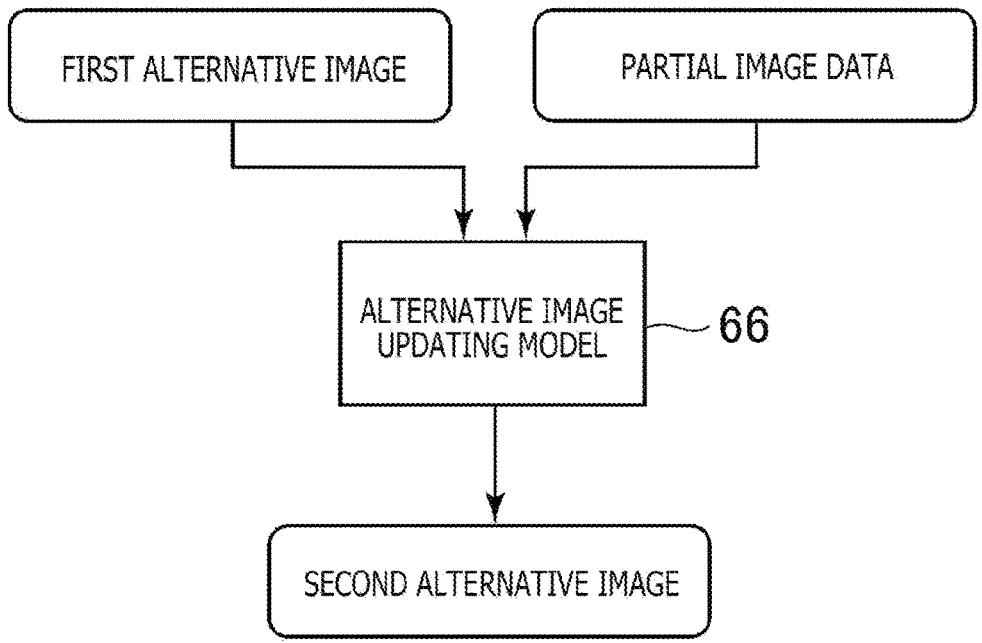
FIG. 11 is a diagram schematically illustrating an exemplary alternative image updating model.

It is assumed that it is confirmed in the processing in S208 that the reception of part of the image data in the frame has succeeded (S208: Y). In this case, the alternative image generation unit 48 updates the alternative image for the frame on the basis of the part of the image data received in the frame (S209). In the processing in S209, the part of the image data received in the frame is reflected in the alternative image for the frame. Here, alternative image updating processing using an alternative image updating model 66 that is the trained machine learning model exemplified in FIG. 11 is executed. Here, the alternative image updating model 66 may employ deep learning. The alternative image updating model 66 may include the coupled topology information and coupling strength parameter information regarding the nodes included in the neural network.

In the processing in S209, for example, a first alternative image stored in the processing in S206 in the immediately preceding frame, and partial image data that is the part of the image data received in the frame in question are input to the alternative image updating model 66. Then, the alternative image updating model 66 outputs a second alternative image based on the input. In such a way, the first alternative image stored in the processing in S206 in the immediately preceding frame is updated to the second alternative image. Here, the alternative image updating model 66 is included in the alternative image generation unit 48, for example.

Figure 12:
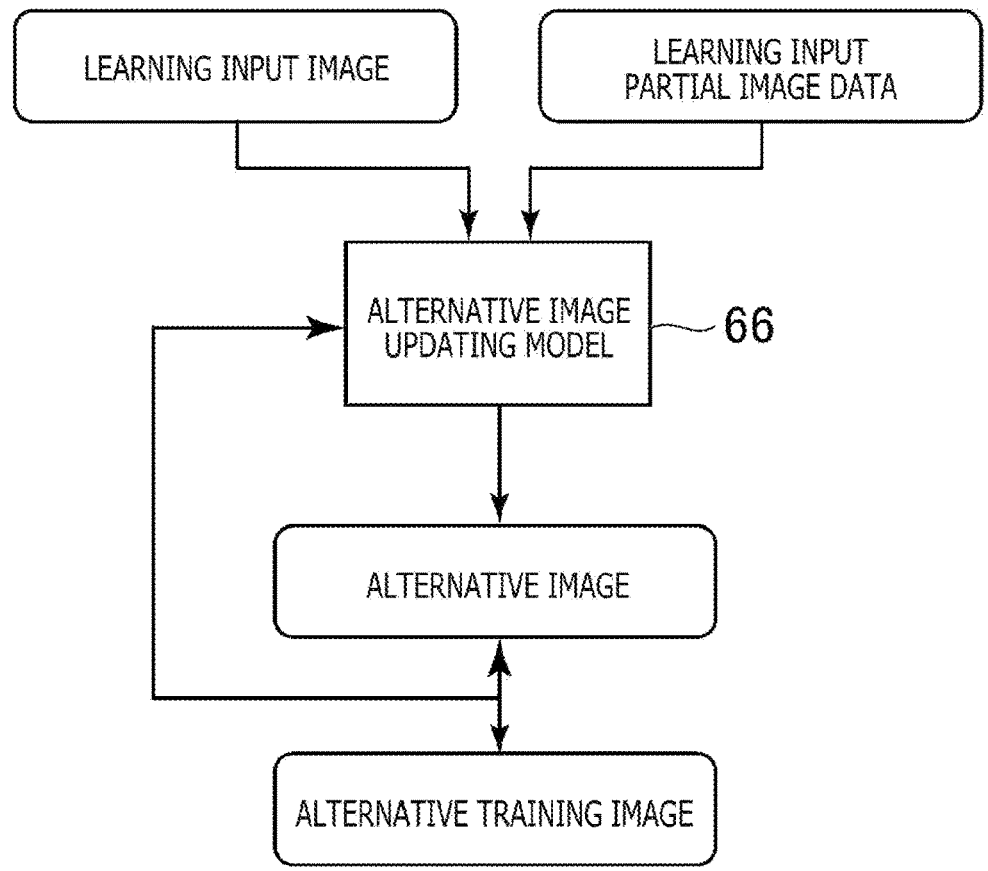
FIG. 12 is a diagram schematically illustrating exemplary learning of the alternative image updating model illustrated in FIG. 11.

FIG. 12 is a diagram schematically illustrating exemplary learning of the alternative image updating model 66 illustrated in FIG. 11. With the alternative image updating model 66, for example, learning using a plurality of pieces of learning data is executed. The learning data includes, for example, learning input data including a learning input image and learning input partial image data, and an alternative training image that is training data to be compared to an alternative image that is output from the alternative image updating model 66.

For example, it is assumed that the fundamental image is a decoded image. In this case, the downscaling processing described above, the encoding processing described above, and the decoding processing described above may be executed on a high-resolution image (for example, 4K image) that is a frame image included in a given moving image. With this, a learning input image that is a low-resolution image (for example, 2K image) may be generated. Further, for example, it is assumed that the fundamental image is an upscaled image. In this case, the downscaling processing described above, the encoding processing described above, the decoding processing described above, and the upscaling processing described above may be executed on a high-resolution image (for example, 4K image) that is a frame image included in the moving image. With this, a learning input image that is a high-resolution image may be generated.

Then, learning input partial image data that is part of image data generated by executing the downscaling processing described above and the encoding processing described above on a frame image in the frame next to a frame image corresponding to the learning input image in the above-mentioned given moving image may be generated.

Then, learning data including learning input data including the learning input image described above and the learning input partial image data described above, and an alternative training image that is the frame image in the frame next to the frame image corresponding to the learning input image in the above-mentioned given moving image may be generated. Then, with supervised learning using a plurality of pieces of learning data generated in such a way on the basis of many moving images and many frame images, the learning of the alternative image updating model 66 may be executed. For example, an alternative image that is output when the learning input data included in the learning data is input to the alternative image updating model 66 and the alternative training image included in the learning data in question may be compared to each other. Then, on the basis of the result of the comparison, the parameters of the alternative image updating model 66 may be updated by back propagation, so that the learning of the alternative image updating model 66 may be executed.

Note that, the learning of the alternative image updating model 66 is not limited to the method described above. For example, the learning of the alternative image updating model 66 may be executed by unsupervised learning or reinforcement learning.

In a case where the processing in S209 ends or it is confirmed in the processing in S208 that the reception of part of the image data in the frame has not succeeded (S208: N), the alternative image generation unit 48 starts the generation of an alternative image for the next frame (S210). Here, in the case where the processing in S209 ends, the alternative image generation unit 48 may store the alternative image updated in the processing in S209 in the image storage unit 46 as a fundamental image. Then, the alternative image generation unit 48 may start the generation of an alternative image for the next frame on the basis of the fundamental image. Further, in the case where, in the processing in S208, the reception of part of the image data in the frame has not succeeded, the alternative image stored in the processing in S206 in the immediately preceding frame may be stored in the image storage unit 46 as a fundamental image. Then, the alternative image generation unit 48 may start the generation of an alternative image for the next frame on the basis of the fundamental image.

Here, alternative image generation processing using the alternative image generation model 64 that is the trained machine learning model exemplified in FIG. 9 is executed. Here, the alternative image generation model 64 may employ deep learning.

Then, the alternative image generation unit 48 stores the alternative image for the next frame, which has been generated in the processing that had started in S210, in the image storage unit 46 (S211).

Then, the display control unit 50 causes the display unit 12f to display the alternative image for the frame (S212), and the processing returns to the processing in S201.

In this processing example, it is assumed that it is confirmed in the nth frame that the reception of all the image data in the nth frame has succeeded (S203: Y). In this case, an upscaled image generated on the basis of the image data received in the nth frame is displayed (S207). Further, in this case, in the nth frame, an alternative image for the (n+1)-th frame is generated on the basis of the upscaled image (S205 and S206).

It is assumed that it is confirmed in the nth frame that the reception of all the image data in the nth frame has failed but the reception of part of the image data in the nth frame has succeeded (S203: N and S208: Y). In this case, in the nth frame, an alternative image for the nth frame generated in the (n−1)-th frame is updated (S209). Then, the updated alternative image for the nth frame is displayed (S212). Further, in this case, in the nth frame, an alternative image for the (n+1)-th frame is generated on the basis of the updated alternative image for the nth frame (S210 and S211).

It is assumed that it is confirmed in the nth frame that the reception of all the image data in the nth frame has failed and the reception of part of the image data in the nth frame has not succeeded (S203: N and S208: N). In this case, in the nth frame, the alternative image for the nth frame generated in the (n−1)-th frame is displayed (S212). Further, in this case, in the nth frame, the alternative image for the (n+1)-th frame is generated on the basis of the alternative image for the nth frame generated in the (n−1)-th frame (S210 and S211).

Further, in this processing example, before the generation of an alternative image for the next frame starts and the storage of the alternative image for the next frame ends, the display of an upscaled image or the display of an alternative image for the frame in question may be executed.

Further, the alternative image updating model 66 may output a determination value indicating whether or not a false image different from an image supposed to be displayed is output as a second alternative image. For example, a determination value "1" may be output in a case where a false image different from an image supposed to be displayed is output as a second alternative image, and a determination value "0" may be output in a case where an image supposed to be displayed is output as the second alternative image. In this case, the learning of the alternative image updating model 66 may be executed using training data including a given learning determination value based on learning input data that is compared to a determination value output from the alternative image updating model 66 when receiving the learning input data. In this case, in the processing in S209, the alternative image updating model 66 may also output the determination value.

Then, on the basis of the determination value, in the processing in S212, the display control unit 50 may control whether or not to cause the display unit 12f to display the alternative image generated in the frame. For example, in a case where the alternative image updating model 66 outputs the determination value "1," the display control unit 50 may perform control of preventing the display of the alternative image. Further, in a case where the alternative image updating model 66 outputs the determination value "0," the display control unit 50 may perform control of displaying the alternative image.

Further, in a similar manner, the alternative image generation model 64 may output a determination value indicating whether or not a false image different from an image supposed to be displayed is output as an alternative image. For example, the determination value "1" may be output in a case where a false image different from an image supposed to be displayed is output as an alternative image, and the determination value "0" may be output in a case where an image supposed to be displayed is output as the alternative image. In this case, the learning of the alternative image generation model 64 may be executed using training data including a given learning determination value based on learning input data that is compared to a determination value output from the alternative image generation model 64 when receiving the learning input data. In this case, in the processing in S205 or S210, the alternative image generation model 64 may also output the determination value.

Then, on the basis of the determination value, in the processing in S212 in the next frame, the display control unit 50 may control whether or not to cause the display unit 12f to display the alternative image generated in the frame in question. For example, in a case where the alternative image generation model 64 outputs the determination value "1," the display control unit 50 may perform control of preventing the display of the alternative image. Further, in a case where the alternative image generation model 64 outputs the determination value "0," the display control unit 50 may perform control of displaying the alternative image.

Here, for example, in a case where any one of the alternative image generation model 64 and the alternative image updating model 66 outputs the determination value "1," the display control unit 50 may perform control of preventing the display of the alternative image.

Further, in the processing in S108 of FIG. 3, the data transmission unit 32 may transmit, to the terminal 12, the image data generated in the processing in S103 and the feature amount data that has been generated in the processing in S104 and is associated with the image data. In this case, the transmission control unit 30 may perform control of giving priority to the transmission of the feature amount data to the terminal 12 over the transmission of the image data. In this case, the data transmission unit 32 may give priority to the transmission of the feature amount data to the terminal 12 over the transmission of the image data. For example, the transmission of the feature amount data to the terminal 12 may be given priority over the transmission of the image data, with the use of Quality of Service (QoS) or priority control technology.

Figure 13:
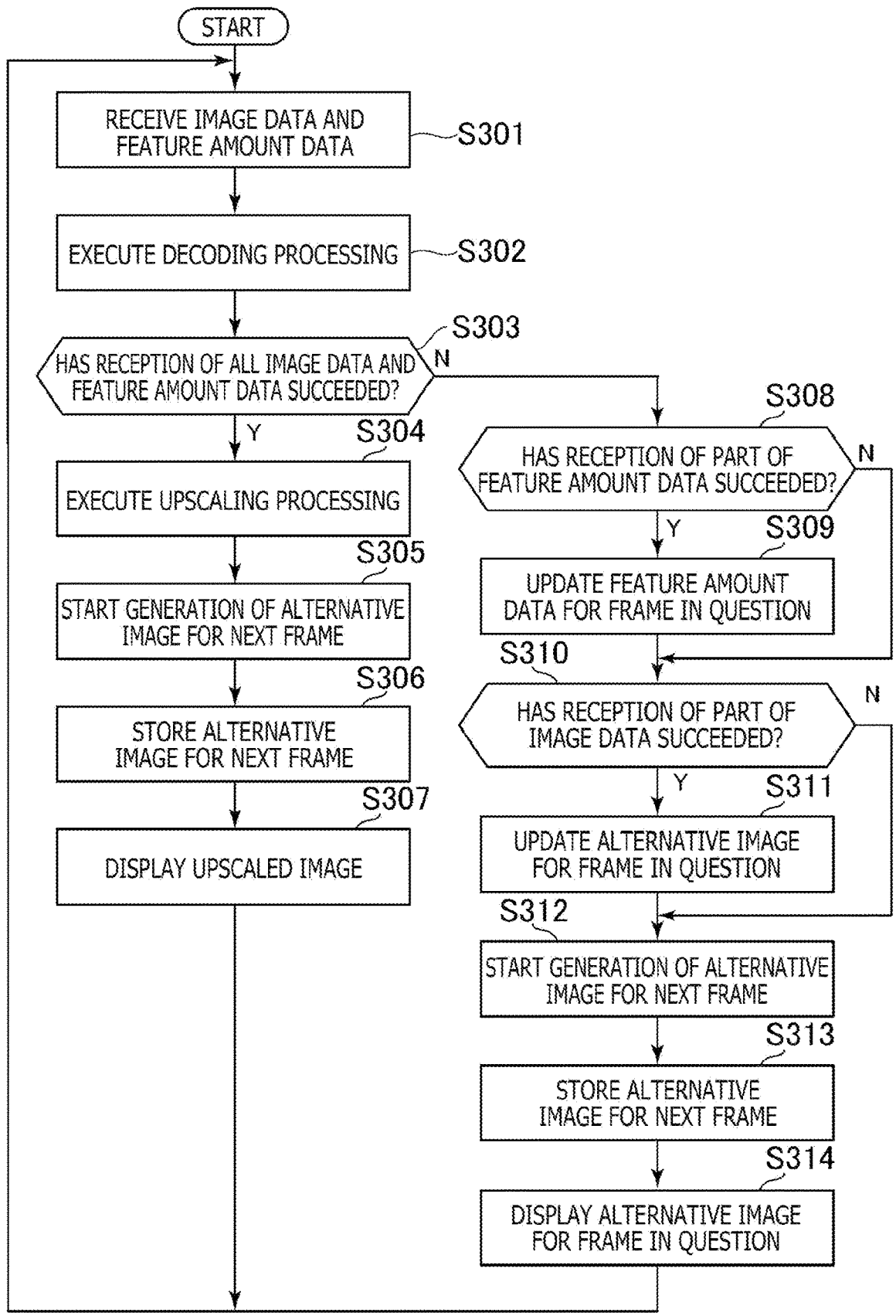
FIG. 13 is a flow chart illustrating another exemplary flow of processing that is performed in the terminal according to the embodiment of the present invention.

Here, an exemplary flow of upscaled image or alternative image display control processing that is executed in the terminal 12 in a case where image data and feature amount data is transmitted to the terminal 12 is described with reference to the flow chart of FIG. 13. The processing in S301 to S314 illustrated in FIG. 13 is repeatedly executed at a predetermined frame rate (for example, 60 fps). Note that the processing in S301 to S314 may be repeatedly executed at a variable frame rate.

First, the data reception unit 40 receives the image data transmitted from the cloud server 10 in the processing in S108 and feature amount data associated with the image data (S301).

Then, the decoding processing unit 42 executes decoding processing on the image data received in the processing in S301, to generate a decoded image (S302).

Then, the upscaling unit 44 checks whether or not the reception of all the image data and feature amount data in the frame has succeeded (S303). In a case where the terminal 12 has not received the image data and the feature amount data or in a case where the terminal 12 has only received the broken image data and feature amount data, it is confirmed in the processing in S303 that the reception of all the image data and feature amount data in the frame has failed. Further, in a case where no decoded image has been generated in the processing in S302, it may be confirmed in the processing in S303 that the reception of all the image data and feature amount data in the frame has failed. Further, here, in a case where the reception of all the image data and feature amount data has failed, the data reception unit 40 may notify the upscaling unit 44 of the failure of the reception of all the image data and feature amount data. Then, when the upscaling unit 44 receives the notification, it may be confirmed in the processing in S303 that the reception of all the image data in the frame has failed.

Figure 14:
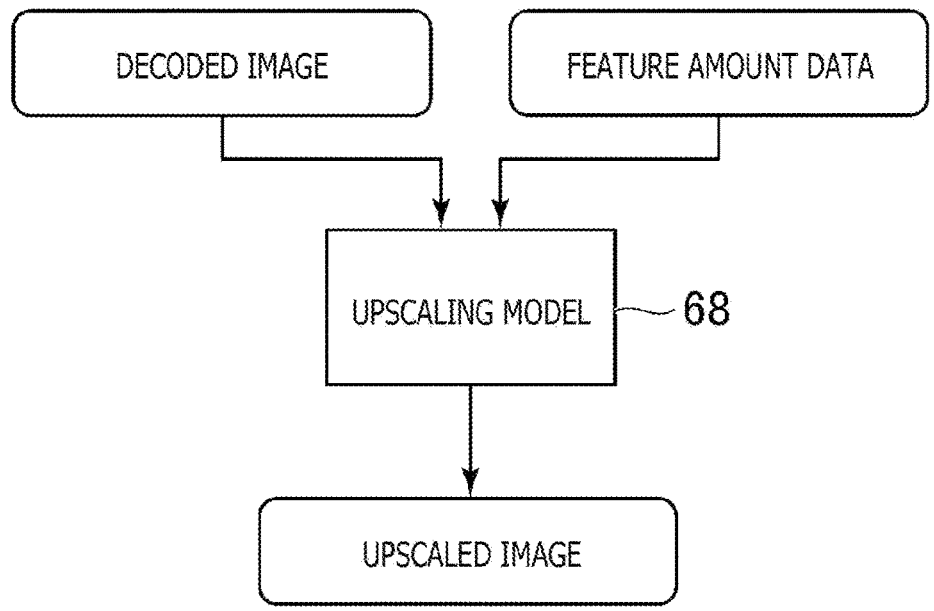
FIG. 14 is a diagram schematically illustrating another exemplary upscaling model.

It is assumed that it is confirmed in the processing in S303 that the reception of all the image data and feature amount data in the frame has succeeded (S303: Y). In this case, the upscaling unit 44 executes upscaling processing on the decoded image generated in the processing in S302, to generate an upscaled image (S304). Here, upscaling processing using an upscaling model 68 that is the trained machine learning model exemplified in FIG. 14 is executed. Here, the upscaling model 68 may employ deep learning. The upscaling model 68 may include the coupled topology information and coupling strength parameter information regarding the nodes included in the neural network.

In the processing in S304, for example, the decoded image generated in the processing in S302 and the feature amount data received in the processing in S301 are input to the upscaling model 68. Then, the upscaling model 68 outputs an upscaled image based on the input. Here, the upscaling model 68 is included in the upscaling unit 44, for example.

Figure 15:
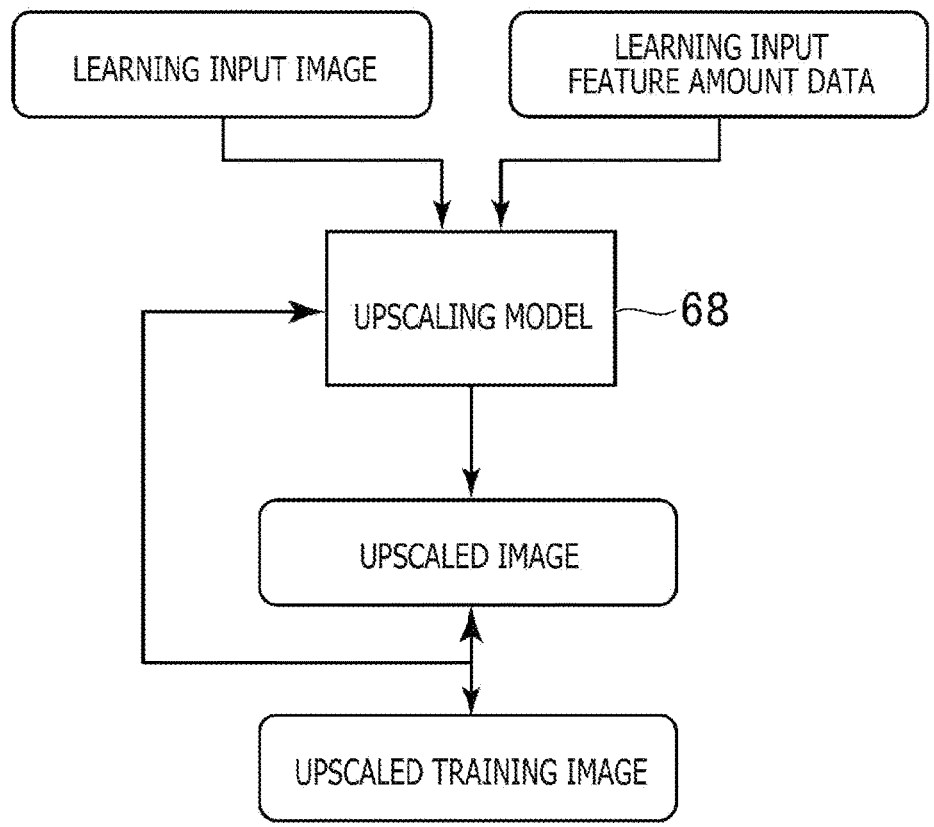
FIG. 15 is a diagram schematically illustrating exemplary learning of the upscaling model illustrated in FIG. 14.

FIG. 15 is a diagram schematically illustrating exemplary learning of the upscaling model 68 illustrated in FIG. 14. With the upscaling model 68, for example, learning using a plurality of pieces of learning data is executed. The learning data includes, for example, learning input data including a learning input image and learning input feature amount data, and an upscaled training image that is training data to be compared to an upscaled image output from the upscaling model 68.

For example, by executing the downscaling processing described above, the encoding processing described above, and the decoding processing described above on a high-resolution image (for example, 4K image), a learning input image that is a low-resolution image (for example, 2K image) may be generated. Then, by processing similar to the processing described above, learning input feature amount data that is feature amount data corresponding to the high-resolution image may be generated.

Then, learning data including learning input data including the learning input image described above and the learning input feature amount data described above, and an upscaled training image that is the high-resolution image described above may be generated. Then, with supervised learning using a plurality of pieces of learning data generated in such a way on the basis of many high-resolution images, the learning of the upscaling model 68 may be executed. For example, an upscaled image that is output when the learning input data included in the learning data is input to the upscaling model 68 and the upscaled training image included in the learning data in question may be compared to each other. Then, on the basis of the result of the comparison, the parameters of the upscaling model 68 may be updated by back propagation, so that the learning of the upscaling model 68 may be executed.

Note that, the learning of the upscaling model 68 is not limited to the method described above. For example, the learning of the upscaling model 68 may be executed by unsupervised learning or reinforcement learning.

When the processing in S304 ends, the alternative image generation unit 48 starts the generation of an alternative image for the next frame on the basis of a fundamental image and feature amount data corresponding to the fundamental image (S305). Here, for example, the upscaling unit 44 may store the fundamental image and the feature amount data corresponding to the fundamental image in the image storage unit 46 in association with each other. Here, the fundamental image is, for example, an image generated on the basis of the image data received in the processing in S301 to be used for alternative image generation. Here, for example, the upscaled image generated in the processing in S304 may be stored in the image storage unit 46 as a fundamental image. Further, for example, the decoded image generated in the processing in S302 may be stored in the image storage unit 46 as a fundamental image. Further, the feature amount data stored in the image storage unit 46 may be, for example, feature amount data associated with the image data received in the processing in S301. Then, the alternative image generation unit 48 may start the generation of an alternative image based on the fundamental image and the feature amount data corresponding to the fundamental image, which are stored in the image storage unit 46.

Figure 16:
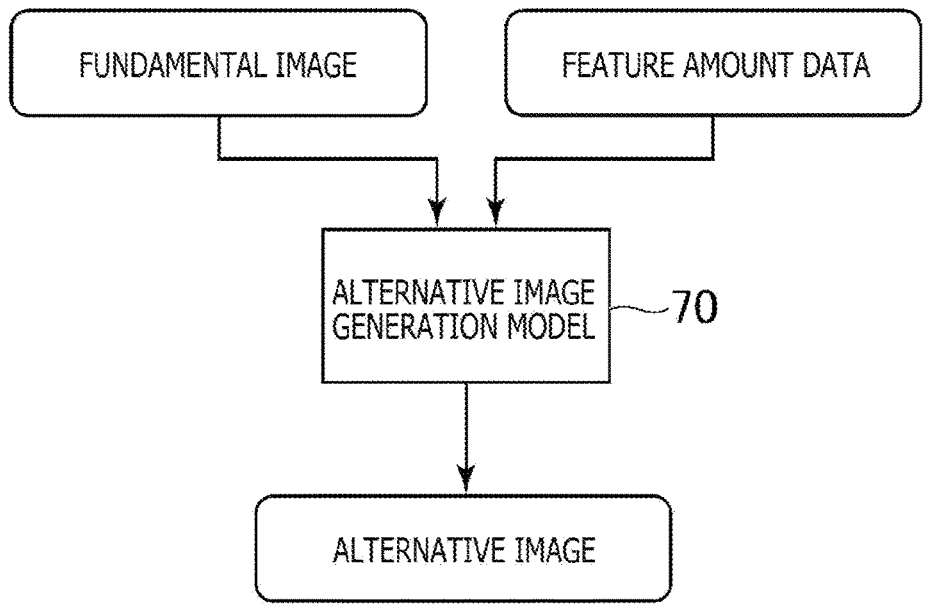
FIG. 16 is a diagram schematically illustrating another exemplary alternative image generation model.

Here, the execution of alternative image generation processing using an alternative image generation model 70 that is the trained machine learning model exemplified in FIG. 16 starts. Here, the alternative image generation model 70 may employ deep learning. The alternative image generation model 70 may include the coupled topology information and coupling strength parameter information regarding the nodes included in the neural network.

In the processing in S305, for example, the fundamental image stored in the image storage unit 46 in the frame and the feature amount data that has been transmitted to the frame and is associated with the fundamental image are input to the alternative image generation model 70. Then, the alternative image generation model 70 outputs an alternative image based on the input. Here, the alternative image generation model 70 is included in the alternative image generation unit 48, for example.

Figure 17:
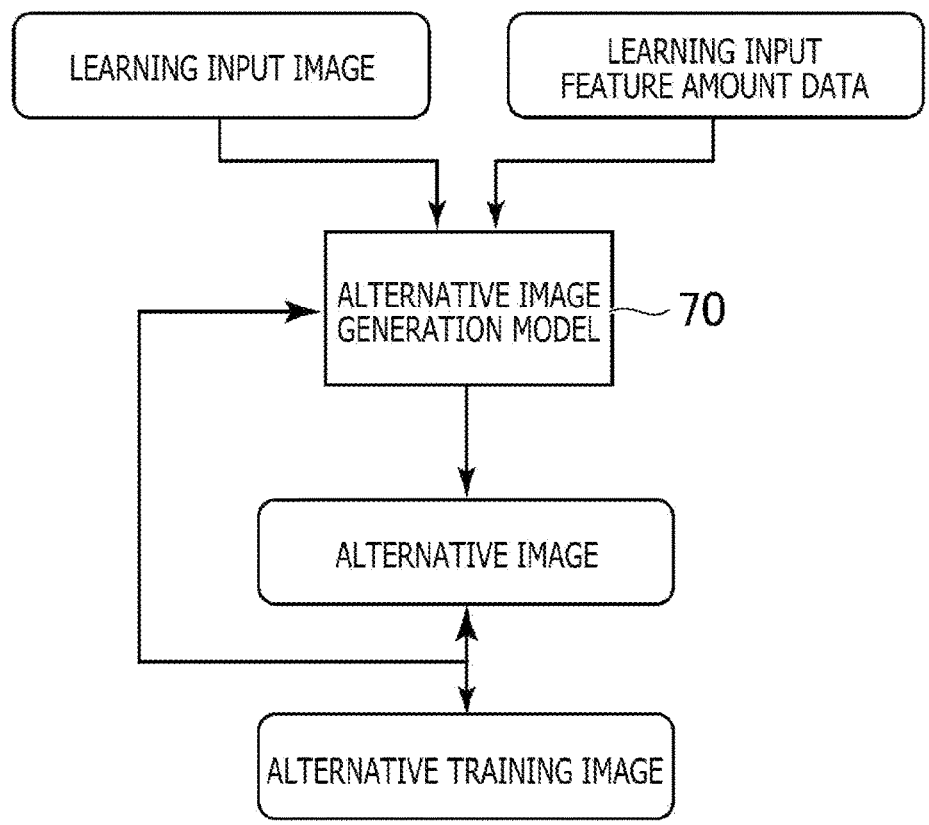
FIG. 17 is a diagram schematically illustrating exemplary learning of the alternative image generation model illustrated in FIG. 16.

FIG. 17 is a diagram schematically illustrating exemplary learning of the alternative image generation model 70 illustrated in FIG. 16. With the alternative image generation model 70, for example, learning using a plurality of pieces of learning data is executed. The learning data includes, for example, learning input data including a learning input image and learning input feature amount data, and an alternative training image that is training data to be compared to an alternative image that is output from the alternative image generation model 70.

For example, it is assumed that the fundamental image is a decoded image. In this case, the downscaling processing described above, the encoding processing described above, and the decoding processing described above may be executed on a high-resolution image (for example, 4K image) that is a frame image included in a given moving image. With this, a learning input image that is a low-resolution image (for example, 2K image) may be generated. Further, for example, it is assumed that the fundamental image is an upscaled image. In this case, the downscaling processing described above, the encoding processing described above, the decoding processing described above, and the upscaling processing described above may be executed on a high-resolution image (for example, 4K image) that is a frame image included in the moving image. With this, a learning input image that is a high-resolution image may be generated. Then, by processing similar to the processing described above, learning input feature amount data that is feature amount data corresponding to the high-resolution image may be generated.

Then, learning data including learning input data including the learning input image described above and the learning input feature amount data described above, and an alternative training image that is a frame image in the frame next to a frame image corresponding to the learning input image in the above-mentioned given moving image may be generated. Then, with supervised learning using a plurality of pieces of learning data generated in such a way on the basis of many moving images and many frame images, the learning of the alternative image generation model 70 may be executed. For example, an alternative image that is output when the learning input data included in the learning data is input to the alternative image generation model 70 and the alternative training image included in the learning data in question may be compared to each other. Then, on the basis of the result of the comparison, the parameters of the alternative image generation model 70 may be updated by back propagation, so that the learning of the alternative image generation model 70 may be executed.

Note that the learning of the alternative image generation model 70 is not limited to the method described above. For example, the learning of the alternative image generation model 70 may be executed by unsupervised learning or reinforcement learning.

Then, the alternative image generation unit 48 stores the alternative image for the next frame, which has been generated in the processing that had started in S305, in the image storage unit 46 (S306). Further, in the processing in S306, the alternative image generation unit 48 also stores the feature amount data used for the alternative image generation in the processing in S305 in the image storage unit 46 as feature amount data for the next frame.

Then, the display control unit 50 causes the display unit 12f to display the upscaled image generated in the processing in S304 (S307), and the processing returns to the processing in S301.

It is assumed that it is confirmed in the processing in S303 that the reception of all the image data and feature amount data in the frame has failed (S303: N). In this case, the alternative image generation unit 48 checks whether or not the reception of part of the feature amount data in the frame has succeeded (S308). In a case where part of the feature amount data that the terminal 12 has received is broken, it is confirmed in the processing in S308 that the reception of part of the feature amount data in the frame has failed. Further, in a case where the decoded image generated in the processing in S302 has missing parts, it may be confirmed in the processing in S308 that the reception of part of the feature amount data in the frame has failed. Further, here, in a case where the reception of part of the feature amount data has failed, the data reception unit 40 may notify the alternative image generation unit 48 of the failure of the reception of part of the feature amount data. Then, when the alternative image generation unit 48 receives the notification, it may be confirmed in the processing in S308 that the reception of part of the feature amount data in the frame has failed.

Figure 18:
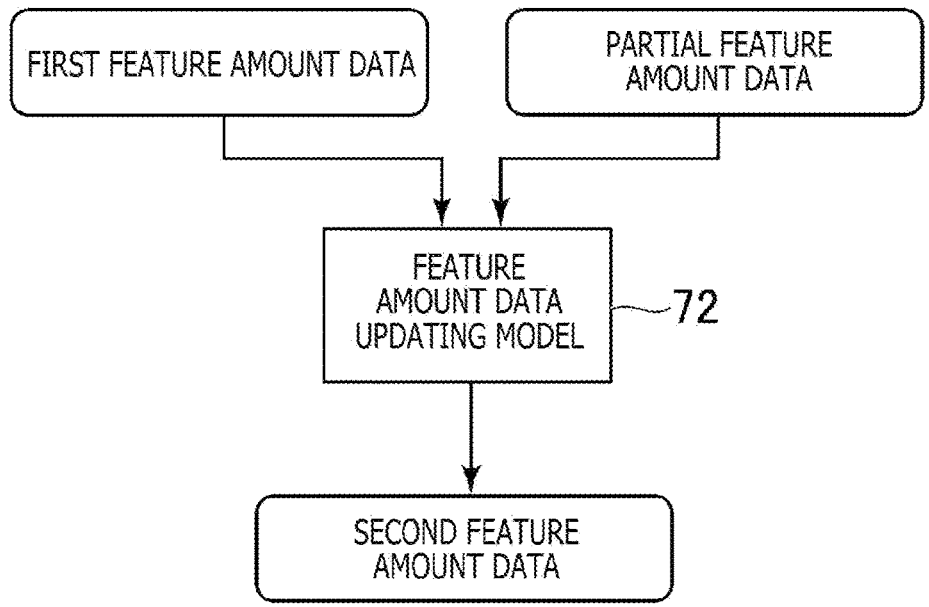
FIG. 18 is a diagram schematically illustrating an exemplary feature amount data updating model.

It is assumed that it is confirmed in the processing in S308 that the reception of part of the feature amount data in the frame has succeeded (S308: Y). In this case, the alternative image generation unit 48 updates the feature amount data for the frame on the basis of the part of the feature amount data received in the frame (S309). In the processing in S309, the feature amount data received in the frame is reflected in the feature amount data for the frame. Here, feature amount data updating processing using a feature amount data updating model 72 that is the trained machine learning model exemplified in FIG. 18 is executed. Here, the feature amount data updating model 72 may employ deep learning. The feature amount data updating model 72 may include the coupled topology information and coupling strength parameter information regarding the nodes included in the neural network.

In the processing in S309, for example, the first feature amount data stored in the processing in S306 in the immediately preceding frame and partial feature amount data that is the part of the feature amount data received in the frame are input to the feature amount data updating model 72. Then, the feature amount data updating model 72 outputs second feature amount data based on the input. In such a way, the first feature amount data stored in the processing in S306 in the immediately preceding frame is updated to the second feature amount data. Here, the feature amount data updating model 72 is included in the alternative image generation unit 48, for example.

Figure 19:
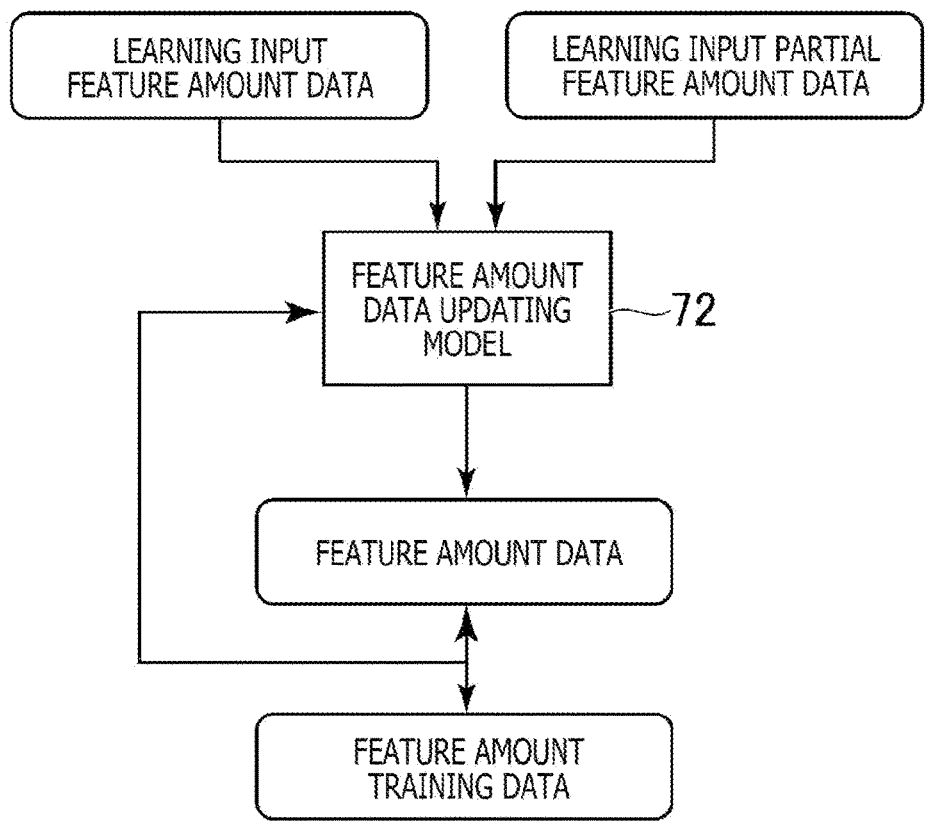
FIG. 19 is a diagram schematically illustrating exemplary learning of the feature amount data updating model illustrated in FIG. 18.

FIG. 19 is a diagram schematically illustrating exemplary learning of the feature amount data updating model 72 illustrated in FIG. 18. With the feature amount data updating model 72, for example, learning using a plurality of pieces of learning data is executed. The learning data includes, for example, learning input data including learning input feature amount data and learning input partial feature amount data, and feature amount training data that is training data to be compared to feature amount data that is output from the feature amount data updating model 72.

For example, by processing similar to the processing described above, learning input feature amount data that is feature amount data corresponding to a high-resolution image (for example, 4K image) that is a first frame image included in a given moving image may be generated. Then, by processing similar to the processing described above, learning input partial feature amount data that is part of feature amount data corresponding to a second frame image that is a frame image in the frame next to the first frame image in the above-mentioned given moving image may be generated.

Then, learning data including learning input data including the learning input feature amount data described above and the learning input partial feature amount data described above, and feature amount training data that is the feature amount data corresponding to the second frame image generated by processing similar to the processing described above may be generated. Then, with supervised learning using a plurality of pieces of learning data generated in such a way on the basis of many moving images and many frame images, the learning of the feature amount data updating model 72 may be executed. For example, feature amount data that is output when the learning input data included in the learning data is input to the feature amount data updating model 72 and the feature amount training data included in the learning data in question may be compared to each other. Then, on the basis of the result of the comparison, the parameters of the feature amount data updating model 72 may be updated by back propagation, so that the learning of the feature amount data updating model 72 may be executed.

Note that the learning of the feature amount data updating model 72 is not limited to the method described above. For example, the learning of the feature amount data updating model 72 may be executed by unsupervised learning or reinforcement learning.

It is assumed that the processing in S309 ends or it is confirmed in the processing in S308 that the reception of part of the feature amount data in the frame has failed (S308: N). In these cases, the alternative image generation unit 48 checks whether or not the reception of part of the image data in the frame has succeeded (S310). In a case where part of the image data that the terminal 12 has received is broken, it is confirmed in the processing in S310 that the reception of part of the image data in the frame has failed. Further, in a case where the decoded image generated in the processing in S302 has missing parts, it may be confirmed in the processing in S310 that the reception of part of the image data in the frame has failed. Further, here, in a case where the reception of part of the image data has failed, the data reception unit 40 may notify the alternative image generation unit 48 of the failure of the reception of part of the image data. Then, when the alternative image generation unit 48 receives the notification, it may be confirmed in the processing in S310 that the reception of part of the image data in the frame has failed.

Figure 20:
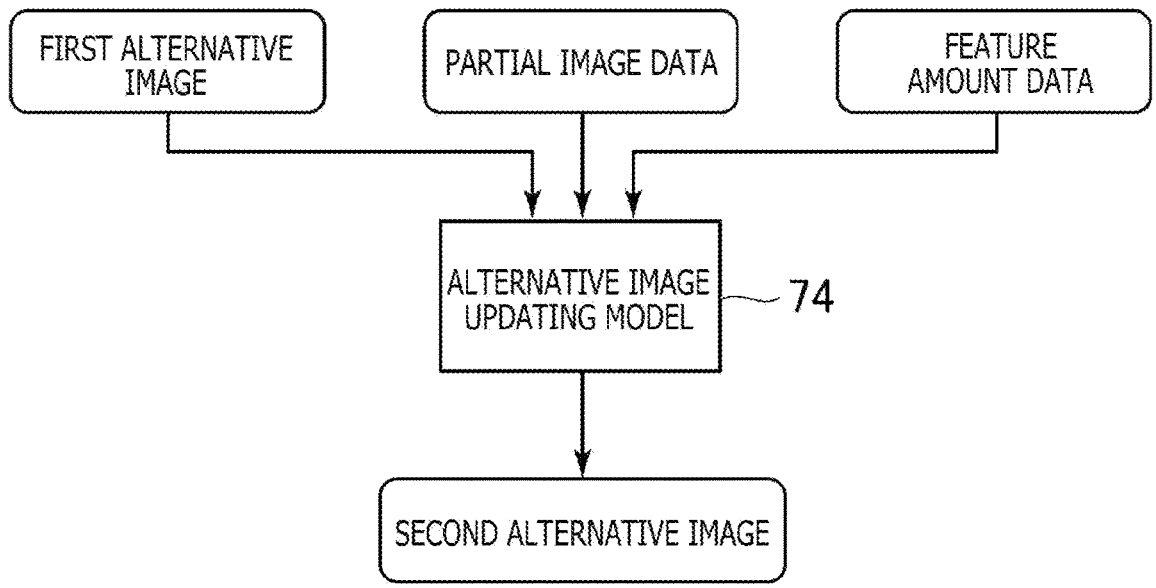
FIG. 20 is a diagram schematically illustrating another exemplary alternative image updating model.

It is assumed that it is confirmed in the processing in S310 that the reception of part of the image data in the frame has succeeded (S310: Y). In this case, the alternative image generation unit 48 updates the alternative image for the frame on the basis of the part of the image data received in the frame (S311). Here, for example, the part of the image data received in the frame is reflected in the alternative image for the frame. Here, alternative image updating processing using an alternative image updating model 74 that is the trained machine learning model exemplified in FIG. 20 is executed. Here, the alternative image updating model 74 may employ deep learning. The alternative image updating model 74 may include the coupled topology information and coupling strength parameter information regarding the nodes included in the neural network.

In the processing in S311, for example, a first alternative image stored in the processing in S306 in the immediately preceding frame, the partial image data that is the part of the image data received in the frame in question, and the feature amount data are input to the alternative image updating model 74. Here, in a case where the processing in S309 is executed, the updated feature amount data for the frame is input to the alternative image updating model 74. In a case where the processing in S309 is not executed, on the other hand, the feature amount data for the frame stored in the immediately preceding frame is input to the alternative image updating model 74. Then, the alternative image updating model 74 outputs a second alternative image based on the input. With this, the first alternative image stored in the processing in S306 in the immediately preceding frame is updated to the second alternative image. Here, the alternative image updating model 74 is included in the alternative image generation unit 48, for example.

Figure 21:
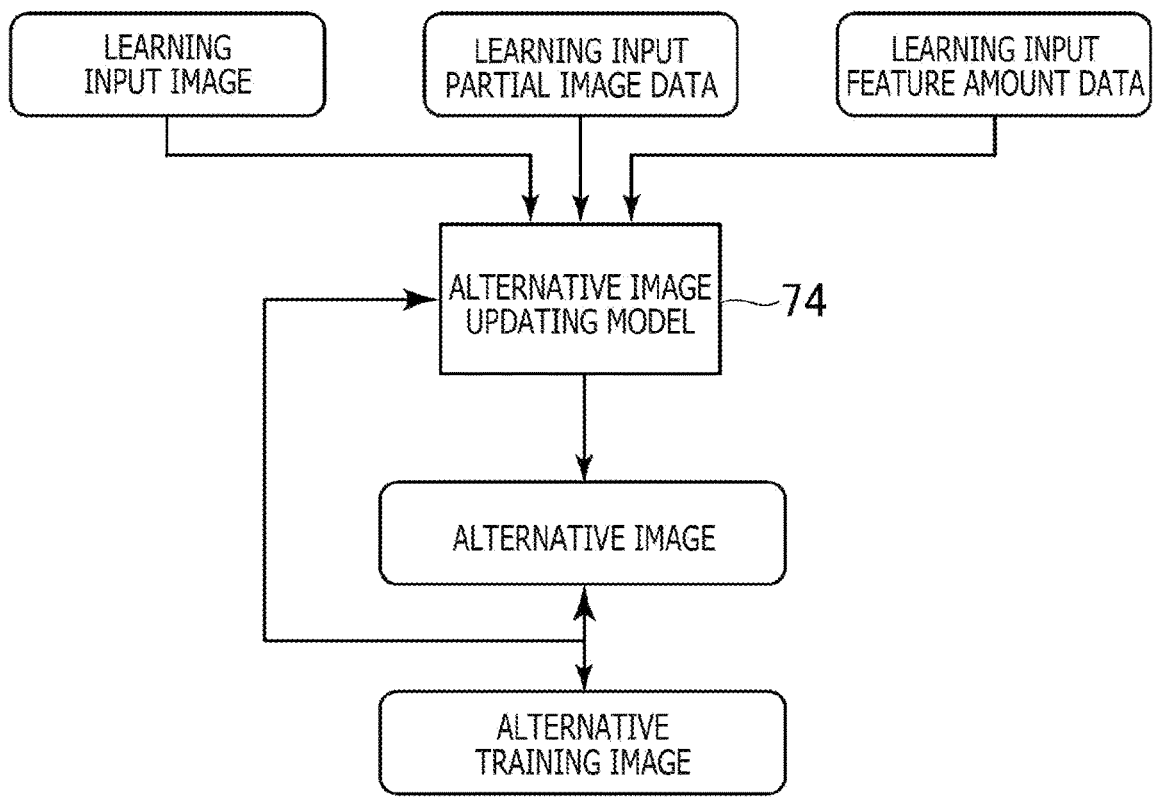
FIG. 21 is a diagram schematically illustrating exemplary learning of the alternative image updating model illustrated in FIG. 20.

FIG. 21 is a diagram schematically illustrating exemplary learning of the alternative image updating model 74 illustrated FIG. 20. With the alternative image updating model 74, for example, learning using a plurality of pieces of learning data is executed. The learning data includes, for example, learning input data including a learning input image, learning input partial image data, and learning input feature amount data, and an alternative training image that is training data to be compared to an alternative image that is output from the alternative image updating model 74.

For example, it is assumed that the fundamental image is a decoded image. In this case, the downscaling processing described above, the encoding processing described above, and the decoding processing described above may be executed on a high-resolution image (for example, 4K image) that is a frame image included in a given moving image. With this, a learning input image that is a low-resolution image (for example, 2K image) may be generated. Further, for example, it is assumed that the fundamental image is an upscaled image. In this case, the downscaling processing described above, the encoding processing described above, the decoding processing described above, and the upscaling processing described above may be executed on a high-resolution image (for example, 4K image) that is a frame image included in the moving image. With this, a learning input image that is a high-resolution image may be generated.

Then, learning input partial image data that is part of image data generated by executing the downscaling processing described above and the encoding processing described above on a second frame image that is a frame image in the frame next to the first frame image corresponding to the learning input image in the above-mentioned given moving image may be generated. Then, by processing similar to the processing described above, learning input feature amount data that is feature amount data corresponding to the first frame image may be generated. Note that feature amount data obtained by updating the feature amount data corresponding to the first frame image on the basis of feature amount data corresponding to the second frame image may be used as learning input feature amount data.

Then, learning data including learning input data including the learning input image described above, the learning input partial image data described above, and the learning input feature amount data described above, and an alternative training image that is the second frame image described above may be generated. Then, with supervised learning using a plurality of pieces of learning data generated in such a way on the basis of many moving images and many frame images, the learning of the alternative image updating model 74 may be executed. For example, an alternative image that is output when the learning input data included in the learning data is input to the alternative image updating model 74 and the alternative training image included in the learning data in question may be compared to each other. Then, on the basis of the result of the comparison, the parameters of the alternative image updating model 74 may be updated by back propagation, so that the learning of the alternative image updating model 74 may be executed.

Note that, the learning of the alternative image updating model 74 is not limited to the method described above. For example, the learning of the alternative image updating model 74 may be executed by unsupervised learning or reinforcement learning.

In a case where the processing in S311 ends or it is confirmed in the processing in S310 that the reception of part of the image data in the frame has not succeeded (S310: N), the alternative image generation unit 48 starts the generation of an alternative image for the next frame (S312). Here, in the case where the processing in S311 ends, the alternative image generation unit 48 may store the alternative image updated in the processing in S311 in the image storage unit 46 as a fundamental image. Further, in the case where, in the processing in S310, the reception of part of the image data in the frame has not succeeded, the alternative image stored in the processing in S306 in the immediately preceding frame may be stored in the image storage unit 46 as a fundamental image. Further, in a case where the processing in S309 is executed, the alternative image generation unit 48 may store the updated feature amount data in the image storage unit 46 in association with the fundamental image. Further, in a case where the processing in S309 is not executed, the alternative image generation unit 48 may store the feature amount data for the frame in the image storage unit 46 in association with the fundamental image. Then, the alternative image generation unit 48 may start the generation of an alternative image for the next frame on the basis of the fundamental image and the feature amount data associated with the fundamental image.

Here, the execution of alternative image generation processing using the alternative image generation model 70 that is the trained machine learning model exemplified in FIG. 16 starts. Here, the alternative image generation model 70 may employ deep learning.

Then, the alternative image generation unit 48 stores the alternative image for the next frame, which has been generated in the processing that had started in S312, in the image storage unit 46 (S313). Here, in a case where the processing in S309 is executed, the alternative image generation unit 48 stores, as feature amount data for the next frame, the updated feature amount data in the image storage unit 46 in association with the alternative image. Further, in a case where the processing in S309 is not executed, the alternative image generation unit 48 stores, as feature amount data for the next frame, the feature amount data for the frame in question in the image storage unit 46 in association with the alternative image.

Then, the display control unit 50 causes the display unit 12f to display the alternative image generated in the frame (S314), and the processing returns to the processing in S301.

In this processing example, it is assumed that it is confirmed in the nth frame that the reception of all the image data and feature amount data in the nth frame has succeeded (S303: Y). In this case, an upscaled image generated on the basis of the image data and the feature amount data received in the nth frame is displayed (S307). Further, in this case, in the nth frame, an alternative image for the (n+1)-th frame is generated on the basis of the upscaled image and the feature amount data (S305 and S306).

It is assumed that, in the nth frame, the reception of all the image data in the nth frame has failed (S303: N) and that it is confirmed that the reception of part of the image data in the nth frame has succeeded (S310: Y). In this case, in the nth frame, the alternative image for the nth frame generated in the (n−1)-th frame is updated (S311). Then, the updated alternative image for the nth frame is displayed (S314). Further, in this case, in the nth frame, on the basis of the updated alternative image for the nth frame and the feature amount data for the nth frame, the alternative image for the (n+1)-th frame is generated (S312 and S313).

It is assumed that, in the nth frame, the reception of all the image data in the nth frame has failed (S303: N) and that it is confirmed that the reception of part of the image data in the nth frame has not succeeded (S310: N). In this case, in the nth frame, the alternative image for the nth frame generated in the (n−1)-th frame is displayed (S314). Further, in this case, in the nth frame, on the basis of the alternative image for the nth frame generated in the (n−1)-th frame and the feature amount data for the nth frame, the alternative image for the (n+1)-th frame is generated (S312 and S313).

Further, in a case where the reception of part of the feature amount data has succeeded in the nth frame (S308: Y), the feature amount data for the nth frame generated in the (n−1)-th frame is updated (S309).

In a case where the partial feature amount data includes ME information data, optical flow data, or the like, an alternative image based on the prediction of the movement of objects in the image can be generated. At this time, other feature amounts indicated by the partial feature amount data are also utilized to increase the prediction accuracy. By utilizing the partial feature amount data, not only the quality of upscaled images, but also the reproducibility in alternative images in terms of in-image object changes in the time direction from the immediately preceding frames can be enhanced.

Further, in this processing example, before the generation of an alternative image for the next frame starts and the storage of the alternative image for the next frame ends, the display of an upscaled image or the display of an alternative image for the frame in question may be executed.

Further, the reception of image data fails but the reception of all feature amount data associated with the image data succeeds in some cases. For example, in such a case, the alternative image generation unit 48 may generate an alternative image on the basis of feature amount data associated with the first image data and the second image data.

Further, in a case where the transmission control unit 30 performs control of preventing the transmission of the second image data, a notification indicating that the image data is not to be transmitted may be transmitted to the terminal 12. In this case, the data transmission unit 32 transmits, to the terminal 12, the notification indicating that the image data is not to be transmitted. Further, in this case, the upscaling unit 44 may check, on the basis of the notification indicating that the image data is not to be transmitted received by the data reception unit 40, whether or not the reception of all the image data in the communication frame has succeeded in the processing in S203 or S303.

Further, the alternative image updating model 74 may output a determination value indicating whether or not a false image different from an image supposed to be displayed is output as a second alternative image. For example, the determination value "1" may be output in a case where a false image different from an image supposed to be displayed is output as a second alternative image, and the determination value "0" may be output in a case where an image supposed to be displayed is output as a second alternative image. In this case, the learning of the alternative image updating model 74 may be executed using training data including a given learning determination value based on learning input data that is compared to a determination value output from the alternative image updating model 74 when receiving the learning input data. In this case, in the processing in S311, the alternative image updating model 74 may also output the determination value.

Then, on the basis of the determination value, in the processing in S314, the display control unit 50 may control whether or not to cause the display unit 12f to display the alternative image generated in the frame. For example, in a case where the alternative image updating model 74 outputs the determination value "1," the display control unit 50 may perform control of preventing the display of the alternative image. Further, in a case where the alternative image updating model 74 outputs the determination value "0," the display control unit 50 may perform control of displaying the alternative image.

Further, in a similar manner, the alternative image generation model 70 may output a determination value indicating whether or not a false image different from an image supposed to be displayed is output as an alternative image. For example, the determination value "1" may be output in a case where a false image different from an image supposed to be displayed is output as an alternative image, and the determination value "0" may be output in a case where an image supposed to be displayed is output as an alternative image. In this case, the learning of the alternative image generation model 70 may be executed using training data including a given learning determination value based on learning input data that is compared to a determination value output from the alternative image generation model 70 when receiving the learning input data. In this case, in the processing in S305 or S312, the alternative image generation model 70 may also output the determination value.

Then, on the basis of the determination value, in the processing in S314 in the next frame, the display control unit 50 may control whether or not to cause the display unit 12f to display the alternative image generated in the frame in question. For example, in a case where the alternative image generation model 70 outputs the determination value "1," the display control unit 50 may perform control of preventing the display of the alternative image. Further, in a case where the alternative image generation model 70 outputs the determination value "0," the display control unit 50 may perform control of displaying the alternative image.

Here, for example, in a case where any one of the alternative image generation model 70 and the alternative image updating model 74 outputs the determination value "1," the display control unit 50 may perform control of preventing the display of the alternative image.

As described above, in the present embodiment, the cloud server 10 performs image data transmission control based on the possibility that the terminal 12 successfully estimates a to-be-displayed image to be generated. Thus, according to the present embodiment, the image data traffic can be reduced while the risk that a false moving image different from an image supposed to be displayed is displayed is reduced.

Note that, the present invention is not limited to the embodiment described above.

For example, on the basis of the chronological order of feature amount data including the first feature amount data described above and the second feature amount data described above, the possibility of successful estimation of the second to-be-displayed image on the basis of the first image data by the alternative image generation unit 48 may be determined.

Here, for example, the successful estimation possibility evaluation model 60 may be implemented as a recurrent neural network (RNN).

In this case, in the processing in S106, the successful estimation possibility evaluation model 60 may receive, as input, the chronological order of feature amount data that includes the feature amount data in the frame and is stored in the feature amount data storage unit 28. Then, the successful estimation possibility evaluation model 60 may output successful estimation possibility data based on the input.

Here, in the learning of the successful estimation possibility evaluation model 60, the chronological order of learning input feature amount data that is the chronological order of feature amount data corresponding to a series of high-resolution images (for example, 4K images) (chronological order of high-resolution images) may be generated.

Then, the user may check, with his/her eyes, a comparison between the series of high-resolution images or a comparison between the series of high-resolution images and alternative images generated by the alternative image generation unit 48, to thereby decide the value of the successful estimation possibility training data. Further, for example, the user may decide the value of the successful estimation possibility training data by rule of thumb.

Then, learning data including learning input data including the chronological order of learning input feature amount data described above, and the successful estimation possibility training data described above may be generated.

Then, with supervised learning using a plurality of pieces of learning data generated in such a way on the basis of many moving images and many frame images, the learning of the successful estimation possibility evaluation model 60 may be executed. For example, successful estimation possibility data that is output when the learning input data included in the learning data is input to the successful estimation possibility evaluation model 60 and the successful estimation possibility training data included in the learning data in question may be compared to each other. Then, on the basis of the result of the comparison, the parameters of the successful estimation possibility evaluation model 60 may be updated by back propagation, so that the learning of the successful estimation possibility evaluation model 60 may be executed.

Further, for example, the upscaling model 62 may be implemented as an RNN. In this case, the upscaling unit 44 of the terminal 12 may store the decoded image generated in the processing in S202.

In this case, in the processing in S204, the chronological order of decoded images including the latest decoded image may be input to the upscaling model 62. Then, the upscaling model 62 may output an upscaled image based on the input.

Here, in the learning of the upscaling model 62, by executing the downscaling processing, encoding processing, and decoding processing described above on a series of high-resolution images (for example, 4K images) (chronological order of high-resolution images), the chronological order of learning input images that are low-resolution images (for example, 2K images) may be generated.

Then, learning data including learning input data including the chronological order of learning input images described above, and an upscaled training image that is the chronologically last image of the high-resolution images described above may be generated. Then, with supervised learning using a plurality of pieces of learning data generated in such a way on the basis of the chronological order of many high-resolution images, the learning of the upscaling model 62 may be executed. For example, an upscaled image that is output when the learning input data included in the learning data is input to the upscaling model 62 and the upscaled training image included in the learning data in question may be compared to each other. Then, on the basis of the result of the comparison, the parameters of the upscaling model 62 may be updated by back propagation, so that the learning of the upscaling model 62 may be executed.

Further, for example, the alternative image generation model 64 may be implemented as an RNN. In this case, the alternative image generation unit 48 of the terminal 12 may store fundamental images.

In this case, in the processing in S205 or S210, the chronological order of fundamental images including the latest fundamental image may be input to the alternative image generation model 64. Then, the alternative image generation model 64 may output an alternative image based on the input.

For example, it is assumed that the fundamental image is a decoded image. In this case, in the learning of the alternative image generation model 64, by executing the downscaling processing, encoding processing, and decoding processing described above on a series of high-resolution images (for example, 4K images) (chronological order of high-resolution images) included in a given moving image, the chronological order of learning input images that are low-resolution images (for example, 2K images) may be generated. Further, for example, it is assumed that the fundamental image is an upscaled image. In this case, in the learning of the alternative image generation model 64, the downscaling processing, encoding processing, decoding processing, and upscaling processing described above may be executed on the series of high-resolution images (for example, 4K images) included in the given moving image. With this, the chronological order of learning input images that are high-resolution images may be generated.

Then, learning data including learning input data including the chronological order of learning input images described above, and an alternative training image that is a frame image in the frame next to the series of high-resolution images described above in the above-mentioned given moving image may be generated. Then, with supervised learning using a plurality of pieces of learning data generated in such a way on the basis of many moving images and many frame images, the learning of the alternative image generation model 64 may be executed. For example, an alternative image that is output when the learning input data included in the learning data is input to the alternative image generation model 64 and the alternative training image included in the learning data in question may be compared to each other. Then, on the basis of the result of the comparison, the parameters of the alternative image generation model 64 may be updated by back propagation, so that the learning of the alternative image generation model 64 may be executed.

Further, for example, the alternative image updating model 66 may be implemented as an RNN. In this case, the alternative image generation unit 48 of the terminal 12 may store alternative images.

In this case, the alternative image updating model 66 may receive, as input, the chronological order of alternative images including an alternative image in the immediately preceding frame and partial image data that is part of image data received in the frame in question. Then, the alternative image updating model 66 may output a second alternative image based on the input.

For example, it is assumed that the fundamental image is a decoded image. In this case, in the learning of the alternative image updating model 66, by executing the downscaling processing, encoding processing, and decoding processing described above on a series of high-resolution images (for example, 4K images) (chronological order of high-resolution images) included in a given moving image, the chronological order of learning input images that are low-resolution images (for example, 2K images) may be generated. Further, for example, it is assumed that the fundamental image is an upscaled image. In this case, in the learning of the alternative image updating model 66, the downscaling processing, encoding processing, decoding processing, and upscaling processing described above may be executed on the series of high-resolution images (for example, 4K images) included in the given moving image. With this, the chronological order of learning input images that are high-resolution images may be generated.

Then, learning input partial image data that is part of image data generated by executing the downscaling processing and encoding processing described above on a frame image in the frame next to the series of high-resolution images described above in the above-mentioned given moving image may be generated.

Then, learning data including learning input data including the chronological order of learning input images and learning input partial image data described above, and an alternative training image that is the frame image in the frame next to the series of high-resolution images in the given moving image described above may be generated. Then, with supervised learning using a plurality of pieces of learning data generated in such a way on the basis of many moving images and many frame images, the learning of the alternative image updating model 66 may be executed. For example, an alternative image that is output when the learning input data included in the learning data is input to the alternative image updating model 66 and the alternative training image included in the learning data in question may be compared to each other. Then, on the basis of the result of the comparison, the parameters of the alternative image updating model 66 may be updated by back propagation, so that the learning of the alternative image updating model 66 may be executed.

Further, for example, the upscaling model 68 may be implemented as an RNN. In this case, the upscaling unit 44 of the terminal 12 may store the decoded image generated in the processing in S302 and the feature amount data received in the processing in S301.

In this case, in the processing in S304, the upscaling model 68 may receive, as input, the chronological order of decoded images including the latest decoded image and the chronological order of feature amount data including the latest feature amount data. Then, the upscaling model 68 may output an upscaled image based on the input.

Here, in the learning of the upscaling model 68, by executing the downscaling processing, encoding processing, and decoding processing described above on a series of high-resolution images (for example, 4K images) (chronological order of high-resolution images), the chronological order of learning input images that are low-resolution images (for example, 2K images) may be generated. Then, by processing similar to the processing described above, the chronological order of learning input feature amount data that is the chronological order of feature amount data corresponding to the series of high-resolution images may be generated.

Then, learning data including learning input data including the chronological order of learning input images and chronological order of learning input feature amount data described above, and an upscaled training image that is the chronologically last image of the high-resolution images described above may be generated. Then, with supervised learning using a plurality of pieces of learning data generated in such a way on the basis of the chronological order of many high-resolution images, the learning of the upscaling model 68 may be executed. For example, an upscaled image that is output when the learning input data included in the learning data is input to the upscaling model 68 and the upscaled training image included in the learning data in question may be compared to each other. Then, on the basis of the result of the comparison, the parameters of the upscaling model 68 may be updated by back propagation, so that the learning of the upscaling model 68 may be executed.

Further, for example, the alternative image generation model 70 may be implemented as an RNN. In this case, the alternative image generation unit 48 of the terminal 12 may store fundamental images and feature amount data associated the fundamental images.

In this case, the alternative image generation model 70 may receive, as input, the chronological order of fundamental images including the latest fundamental image and the chronological order of feature amount data including the latest feature amount data. Then, the alternative image generation model 70 may output an alternative image based on the input.

For example, it is assumed that the fundamental image is a decoded image. In this case, in the learning of the alternative image generation model 64, by executing the downscaling processing, encoding processing, and decoding processing described above on a series of high-resolution images (for example, 4K images) (chronological order of high-resolution images) included in a given moving image, the chronological order of learning input images that are low-resolution images (for example, 2K images) may be generated. Further, for example, it is assumed that the fundamental image is an upscaled image. In this case, in the learning of the alternative image generation model 70, the downscaling processing, encoding processing, decoding processing, and upscaling processing described above may be executed on the series of high-resolution images (for example, 4K images) included in the given moving image. With this, the chronological order of learning input images that are high-resolution images may be generated. Then, by processing similar to the processing described above, the chronological order of learning input feature amount data corresponding to the chronological order of the high-resolution images may be generated.

Then, learning data including learning input data including the chronological order of learning input images and chronological order of learning input feature amount data described above, and an alternative training image that is a frame image in the frame next to the series of high-resolution images may be generated. Then, with supervised learning using a plurality of pieces of learning data generated in such a way on the basis of many moving images and many frame images, the learning of the alternative image generation model 70 may be executed. For example, an alternative image that is output when the learning input data included in the learning data is input to the alternative image generation model 70 and the alternative training image included in the learning data in question may be compared to each other. Then, on the basis of the result of the comparison, the parameters of the alternative image generation model 70 may be updated by back propagation, so that the learning of the alternative image generation model 70 may be executed.

Further, for example, the feature amount data updating model 72 may be implemented as an RNN. In this case, the alternative image generation unit 48 of the terminal 12 may store feature amount data.

In this case, the feature amount data updating model 72 may receive, as input, the chronological order of feature amount data including feature amount data in the immediately preceding frame and partial feature amount data that is part of feature amount data received in the frame in question. Then, the feature amount data updating model 72 may output second feature amount data based on the input.

In the learning of the feature amount data updating model 72, by processing similar to the processing described above, the chronological order of learning input feature amount data that is the chronological order of feature amount data corresponding to a series of high-resolution images (for example, 4K images) included in a given moving image may be generated. Then, by processing similar to the processing described above, learning input partial feature amount data that is part of feature amount data corresponding to a second frame image that is a frame image in the frame next to the series of high-resolution images may be generated.

Then, learning data including learning input data including the chronological order of learning input feature amount data and learning input partial feature amount data described above, and feature amount training data that is the feature amount data corresponding to the second frame image described above may be generated. Then, with supervised learning using a plurality of pieces of learning data generated in such a way on the basis of many moving images and many frame images, the learning of the feature amount data updating model 72 may be executed. For example, feature amount data that is output when the learning input data included in the learning data is input to the feature amount data updating model 72 and the feature amount training data included in the learning data in question may be compared to each other. Then, on the basis of the result of the comparison, the parameters of the feature amount data updating model 72 may be updated by back propagation, so that the learning of the feature amount data updating model 72 may be executed.

Further, for example, the alternative image updating model 74 may be implemented as an RNN. In this case, the alternative image generation unit 48 of the terminal 12 may store alternative images and feature amount data.

In this case, the alternative image updating model 74 may receive, as input, the chronological order of alternative images including an alternative image in the immediately preceding frame, the chronological order of feature amount data corresponding to the chronological order of alternative images including the alternative image in the immediately preceding frame, and partial image data that is part of image data received in the frame in question. Then, the alternative image updating model 74 may output a second alternative image based on the input.

For example, it is assumed that the fundamental image is a decoded image. In this case, in the learning of the alternative image updating model 74, by executing the downscaling processing, encoding processing, and decoding processing described above on a series of high-resolution images (for example, 4K images) (chronological order of high-resolution images) included in a given moving image, the chronological order of learning input images that are low-resolution images (for example, 2K images) may be generated. Further, for example, it is assumed that the fundamental image is an upscaled image. In this case, in the learning of the alternative image updating model 74, the downscaling processing, encoding processing, decoding processing, and upscaling processing described above may be executed on the series of high-resolution images (for example, 4K images) included in the given moving image. With this, the chronological order of learning input images that are high-resolution images may be generated. Further, by processing similar to the processing described above, the chronological order of learning input feature amount data corresponding to the chronological order of the high-resolution images may be generated.

Then, learning input partial image data that is part of image data generated by executing the downscaling processing and encoding processing described above on a frame image in the frame next to the series of high-resolution images described above in the above-mentioned given moving image may be generated.

Then, learning data including learning input data including the chronological order of learning input images described above, the chronological order of learning input feature amount data described above, and the learning input partial image data, and an alternative training image that is the frame image in the frame next to the series of high-resolution images described above may be generated. Then, with supervised learning using a plurality of pieces of learning data generated in this way on the basis of many moving images and many frame images, the learning of the alternative image updating model 74 may be executed. For example, an alternative image that is output when the learning input data included in the learning data is input to the alternative image updating model 74 and the alternative training image included in the learning data in question may be compared to each other. Then, on the basis of the result of the comparison, the parameters of the alternative image updating model 74 may be updated by back propagation, so that the learning of the alternative image updating model 74 may be executed.

As described above, in the present embodiment, with the use of the machine learning model configured to receive, as input, the chronological order of data, the machine learning model outputs data considering a prediction on a change in a frame on the basis of the chronological order of frame data in the past. Thus, the accuracy of the output result of the machine learning model can be more enhanced.

Further, in the present embodiment, for example, the successful estimation possibility evaluation model 60 may be implemented as a generative adversarial network (GAN). Further, for example, the upscaling model 62 may be implemented as a GAN. Further, for example, the alternative image generation model 64 may be implemented as a GAN. Further, for example, the alternative image updating model 66 may be implemented as a GAN. Further, for example, the upscaling model 68 may be implemented as a GAN. Further, for example, the alternative image generation model 70 may be implemented as a GAN. Further, for example, the feature amount data updating model 72 may be implemented as a GAN. Further, for example, the alternative image updating model 74 may be implemented as a GAN.

Further, for example, the upscaling unit 44 of the terminal 12 may decide, on the basis of data that indicates whether or not to execute super-resolution processing, the data being included in feature amount data, whether or not to execute the super-resolution processing. Then, in a case where the upscaling unit 44 decides not to execute the super-resolution processing, the upscaling unit 44 may perform control of preventing the execution of upscaling processing. Further, in a case where the upscaling unit 44 decides not to execute the super-resolution processing, the upscaling unit 44 may control the alternative image generation unit 48 not to execute the alternative image generation processing. In this case, the display control unit 50 may cause the display unit 12f to display a decoded image or an image displayed in the immediately preceding frame.

Further, for example, the alternative image generation unit 48 of the terminal 12 may decide, on the basis of a fundamental image, whether or not to generate an alternative image. Here, whether or not to generate an alternative image may be decided using the trained alternative image generation model 64 configured to output information indicating whether or not to generate an alternative image, which has been learned by a method similar to the above-mentioned one. Further, the alternative image generation unit 48 may decide whether or not to generate an alternative image on the basis of a fundamental image and feature amount data associated with the fundamental image. Here, whether or not to generate an alternative image may be decided using the trained alternative image generation model 70 configured to output information indicating whether or not to generate an alternative image, which has been learned by a method similar to the above-mentioned one. Then, when it is decided not to generate an alternative image, the display control unit 50 may cause the display unit 12f to display a decoded image or an image displayed in the immediately preceding frame.

Further, for example, a play image to be downscaled may be divided into a plurality of partial images. Here, for example, a play image may be divided into a plurality of partial images each corresponding to a rectangular region with a size of 8×8 pixels or 32×32 pixels, for example. Further, for example, a play image may be horizontally divided, so that the play image may be divided into a plurality of slice-shaped (stripe-shaped) partial images including a plurality of lines (for example, 32 lines). In this case, the partial images correspond to the original image described above. On the original image including the partial images, the series of processing stages in S102 to S108 illustrated in FIG. 3 and S201 to S212 illustrated in FIG. 6 may be executed. Alternatively, on the original image including the partial images, the series of processing stages in S102 to S108 illustrated in FIG. 3 and S301 to S314 illustrated in FIG. 13 may be executed.

Further, irrespective of whether a play image corresponds to an original image or partial images corresponds to the original image, the processing in S204, S206, S209, S211, S304, S306, S311, and S313 may be executed with a smaller granularity than the original image. For example, the processing in S204, S206, S304, and S306 may be executed for each 8×8 pixel image or each 32×32 pixel image. Here, when a decoded image has a 1920×1088 pixel resolution and the processing described above is executed for each 32×32 pixel image, the processing is executed 60×24 times. In this case, a learning input image that is used for the learning of a machine learning model may be an image having the same shape and size as an image that is input to the machine learning model in the processing.

Further, the processing in S304, S309, S311, and S313 may be executed with a smaller granularity than feature amount data. In this case, learning input partial feature amount data or learning input feature amount data that is used for the learning of a machine learning model may be data having the same size as data that is input to the machine learning model in the processing.

Further, the upscaling unit 44 may execute super-resolution processing or extrapolation to generate upscaled images. Further, the alternative image generation unit 48 may execute extrapolation to generate alternative images.

Further, the upscaling model 62, the alternative image generation model 64, the alternative image updating model 66, the upscaling model 68, the alternative image generation model 70, the feature amount data updating model 72, and the alternative image updating model 74 may be individual machine learning models, or may be partly or entirely integrated as an integrated machine learning model.

Further, the scope of the present invention is not limited to cloud gaming services. The present invention is generally applicable to the transmission/reception of image data.

Here, for example, image data or image data and feature amount data may be repeatedly transmitted, from the cloud server 10, to a delivery server configured to deliver a moving image depicting the situation in a video game. Then, the delivery server may store the image data or image data and feature amount data that correspond to a series of play images and have order information. At a later time, in response to a request from a terminal used by a user watching the moving image depicting the situation in the video game, the delivery server may subsequently transmit, to the terminal, the image data or the image data and feature amount data stored in the delivery server according to the order associated with the data. Then, in the terminal, processing similar to the one in the terminal 12 illustrated in FIG. 1 may be executed.

Further, in video game streaming, the delivery server described above may transmit, when receiving image data or image data and feature amount data, the image data or the image data and the feature amount data in real time to a terminal used by a user watching the moving image depicting the situation in the video game. Then, in the terminal, processing similar to the one in the terminal 12 illustrated in FIG. 1 may be executed.

Here, the cloud server 10 may also serve as the abovementioned delivery server configured to transmit image data or image data and feature amount data to a terminal. Further, in the terminal 12, processing similar to the one in the cloud server 10 illustrated in FIG. 1 may be executed, and image data or image data and feature amount data, which correspond to a series of play images, may be repeatedly transmitted from the terminal 12 to the delivery server.

Further, the above concrete character strings and numerical values and the concrete character strings and numerical values in the drawings are illustrative, and the present invention is not limited to these character strings and numerical values.

The invention claimed is:

1. An image transmission/reception system comprising:
an image transmission apparatus; and
an image reception apparatus,
the image transmission apparatus including
an image generation unit configured to generate a first image and generate a second image after generating the first image,
an image data transmission unit configured to transmit first image data generated on a basis of the first image, and
a transmission control unit configured to control whether or not to transmit second image data generated on a basis of the second image,
the image reception apparatus including
an image data reception unit configured to receive the first image data,
a to-be-displayed image generation unit configured to generate a first to-be-displayed image on a basis of the first image data,
an alternative image generation unit configured to generate an alternative image by estimating, on the basis of the first image data, a second to-be-displayed image to be generated on a basis of the second image data by the to-be-displayed image generation unit, and
a display control unit configured to display, after displaying the first to-be-displayed image, any one of the second to-be-displayed image generated on the basis of the second image data and the alternative image, depending on whether or not reception of the second image data has succeeded,
wherein the transmission control unit controls whether or not to transmit the second image data on a basis of a possibility of successful estimation of the second to-be-displayed image on the basis of the first image data by the alternative image generation unit, the possibility being determined on a basis of a feature amount of the first image and a feature amount of the second image.

2. The image transmission/reception system according to claim 1, wherein the transmission control unit controls whether or not to transmit the second image data on the basis of the possibility of successful estimation of the second to-be-displayed image on the basis of the first image data by the alternative image generation unit, the possibility being determined on a basis of a feature amount of the first image and a feature amount of the second image.

3. The image transmission/reception system according to claim 2, wherein the transmission control unit controls whether or not to transmit the second image data on the basis of the possibility of successful estimation of the second to-be-displayed image on the basis of the first image data by the alternative image generation unit, the possibility being determined on a basis of a chronological order of feature amounts including the feature amount of the first image and the feature amount of the second image.

4. The image transmission/reception system according to claim 1, wherein the transmission control unit controls, on the basis of the possibility of successful estimation of the second to-be-displayed image on the basis of the first image data by the alternative image generation unit, the possibility being determined on a basis of a feature amount that includes a parameter that is used for encoding a downscaled image obtained by downscaling the second image, whether or not to transmit the second image data indicating the downscaled image.

5. The image transmission/reception system according to claim 1, wherein
the image data transmission unit transmits the first image data indicating a first downscaled image obtained by downscaling the first image, and
the transmission control unit controls, on the basis of the possibility of successful estimation of the second to-be-displayed image on the basis of the first image data by the alternative image generation unit, the possibility being determined on a basis of a feature amount that includes a parameter that is used for encoding the first downscaled image and a feature amount that includes a parameter that is used for encoding a second downscaled image obtained by downscaling the second image, whether or not to transmit the second image data indicating the second downscaled image.

6. The image transmission/reception system according to claim 2, wherein the feature amount indicates at least any one of pieces of information indicating a feature point of an image, an edge strength of the image, a depth of a pixel included in the image, a texture type of the image, an optical flow in the image, and a moving direction and a speed of a rectangular region in the image.

7. The image transmission/reception system according to claim 2, wherein the transmission control unit performs control of giving priority to transmission of feature amount data indicating the feature amount to the image reception apparatus over transmission of image data indicating an image.

8. The image transmission/reception system according to claim 1, wherein the transmission control unit controls whether or not to transmit the second image data on a basis of whether or not the second image includes a key frame.

9. The image transmission/reception system according to claim 1, wherein the transmission control unit controls whether or not to transmit the second image data on a basis of whether or not a scene in the second image is switched from a scene in the first image.

10. The image transmission/reception system according to claim 1, wherein the transmission control unit controls whether or not to transmit the second image data on a basis of whether or not the second image includes an image of an object that does not appear in the first image.

11. The image transmission/reception system according to claim 1, wherein the alternative image generation unit starts generation of the alternative image on the basis of the first image data before whether or not the reception of the second image data has succeeded is checked.

12. The image transmission/reception system according to claim 1, wherein the transmission control unit performs, in a case where a transmission speed of the image transmission apparatus is higher than a predetermined speed, control of transmitting the second image data, irrespective of the possibility of successful estimation of the second to-be-displayed image on the basis of the first image data by the alternative image generation unit.

13. An image transmission apparatus comprising:
an image generation unit configured to generate a first image and generate a second image after generating the first image;
an image data transmission unit configured to transmit first image data generated on a basis of the first image to an image reception apparatus,
the image reception apparatus including
an image data reception unit configured to receive the first image data,
a to-be-displayed image generation unit configured to generate a first to-be-displayed image on a basis of the first image data,
an alternative image generation unit configured to generate an alternative image by estimating, on the basis of the first image data, a second to-be-displayed image to be generated on a basis of second image data generated on a basis of the second image by the to-be-displayed image generation unit, and
a display control unit configured to display, after displaying the first to-be-displayed image, any one of the second to-be-displayed image generated on the basis of the second image data and the alternative image, depending on whether or not reception of the second image data has succeeded; and
a transmission control unit configured to control whether or not to transmit the second image data generated on the basis of the second image to the image reception apparatus on a basis of a possibility of successful estimation of the second to-be-displayed image on the basis of the first image data by the alternative image generation unit, the possibility being determined on a basis of a feature amount of the first image and a feature amount of the second image.

14. An image reception apparatus comprising:
an image data reception unit configured to receive first image data from an image transmission apparatus;
a to-be-displayed image generation unit configured to generate a first to-be-displayed image on a basis of the first image data;
an alternative image generation unit configured to generate an alternative image by estimating, on the basis of the first image data, a second to-be-displayed image to be generated on a basis of second image data by the to-be-displayed image generation unit; and
a display control unit configured to display, after displaying the first to-be-displayed image, any one of the second to-be-displayed image generated on the basis of the second image data and the alternative image, depending on whether or not reception of the second image data has succeeded, whether or not to transmit the second image data being controlled by the image transmission apparatus on a basis of a possibility of successful estimation of the second to-be-displayed image on the basis of the first image data by the alternative image generation unit, the possibility being determined on a basis of a feature amount of the first image and a feature amount of the second image.

15. An image transmission/reception method comprising:
generating a first image;
generating a second image after generating the first image;
transmitting first image data generated on a basis of the first image;
controlling whether or not to transmit second image data generated on a basis of the second image;
receiving the first image data;
generating a first to-be-displayed image on a basis of the first image data;
generating an alternative image by estimating, on the basis of the first image data, a second to-be-displayed image to be generated on a basis of the second image data in the to-be-displayed image generation; and
displaying, after displaying the first to-be-displayed image, any one of the second to-be-displayed image generated on a basis of the second image data and the alternative image, depending on whether or not reception of the second image data has succeeded,
wherein, the controlling controls whether or not to transmit the second image data on a basis of a possibility of successful estimation of the second to-be-displayed image on the basis of the first image data in the alternative image generation, the possibility being determined on a basis of a feature amount of the first image and a feature amount of the second image.

16. A non-transitory, computer readable storage medium containing a computer program, which when executed by a computer, causes the computer to perform an image transmission/reception method by carrying out actions, comprising:
generating a first image;
generating a second image after generating the first image;
transmitting first image data generated on a basis of the first image to an image reception apparatus,
wherein the generating the first image and the second image includes receiving the first image data, generating a first to-be-displayed image on a basis of the first image data, generating an alternative image by estimating, on the basis of the first image data, a second to-be-displayed image to be generated on a basis of second image data generated on a basis of the second image by the to-be-displayed image generation unit, and displaying, after displaying the first to-be-displayed image, any one of the second to-be-displayed image generated on the basis of the second image data and the alternative image, depending on whether or not reception of the second image data has succeeded; and controlling whether or not to transmit the second image data generated on the basis of the second image to the image reception apparatus on a basis of a possibility of successful estimation of the second to-be-displayed image on the basis of the first image data, the possibility being determined on a basis of a feature amount of the first image and a feature amount of the second image.

17. A non-transitory, computer readable storage medium containing a computer program, which when executed by a computer, causes the computer to perform an image transmission/reception method by carrying out actions, comprising:

receiving first image data from an image transmission apparatus;

generating a first to-be-displayed image on a basis of the first image data;

generating an alternative image by estimating, on the basis of the first image data, a second to-be-displayed image to be generated on a basis of second image data in the to-be-displayed image; and displaying, after displaying the first to-be-displayed image, any one of the second to-be-displayed image generated on the basis of the second image data and the alternative image, depending on whether or not reception of the second image data has succeeded, whether or not to transmit the second image data being controlled on a basis of a possibility of successful estimation of the second to-be-displayed image on the basis of the first image data in the alternative image, the possibility being determined on a basis of a feature amount of the first image and a feature amount of the second image.

* * * * *